United States Patent
Yamaguchi et al.

(10) Patent No.: US 8,558,854 B2
(45) Date of Patent: Oct. 15, 2013

(54) IMAGE RECOGNITION METHOD, IMAGE RECOGNITION APPARATUS AND IMAGE INPUT/OUTPUT APPARATUS

(75) Inventors: Kazunori Yamaguchi, Tokyo (JP);
Michiru Senda, Kanagawa (JP);
Mitsuru Tateuchi, Kanagawa (JP);
Tsutomu Harada, Kanagawa (JP);
Ryoichi Tsuzaki, Kanagawa (JP)

(73) Assignee: Japan Display West, Inc., Aichi-Ken (JP)

( * ) Notice: Subject to any disclaimer, the term of this patent is extended or adjusted under 35 U.S.C. 154(b) by 1107 days.

(21) Appl. No.: 12/461,172

(22) Filed: Aug. 4, 2009

(65) Prior Publication Data
US 2010/0053227 A1 Mar. 4, 2010

(30) Foreign Application Priority Data
Aug. 28, 2008 (JP) ................ 2008-219198

(51) Int. Cl.
*G09G 5/10* (2006.01)
*G06F 3/042* (2006.01)
*G06K 9/00* (2006.01)

(52) U.S. Cl.
USPC .............. 345/690; 345/175; 382/181

(58) Field of Classification Search
USPC ........................................ 345/175
See application file for complete search history.

(56) References Cited

U.S. PATENT DOCUMENTS 4,707,689 A * 11/1987 DiPiazza et al. .............. 345/175
2003/0179323 A1 * 9/2003 Abileah et al. ................. 349/24

FOREIGN PATENT DOCUMENTS

JP 2007-025796 2/2007
JP 2008-097172 A 4/2008

OTHER PUBLICATIONS

Japanese Office Action issued Aug. 4, 2010 for corresponding Japanese Application No. 2008-219198.

* cited by examiner

*Primary Examiner* — Charles V Hicks
(74) *Attorney, Agent, or Firm* — Rader, Fishman & Grauer PLLC

(57) ABSTRACT

An image recognition method includes: a first step of acquiring n-th received light data at light receiving elements arranged in a matrix form on a light receiving surface; a second step of acquiring (n+1)-th received light data at the light receiving elements; a third step of calculating differential data resulting from subtraction of the n-th received light data acquired from the (n+1)-th received light data acquired; and a fourth step of carrying out image recognition based on the differential data.

12 Claims, 17 Drawing Sheets

FIG.3
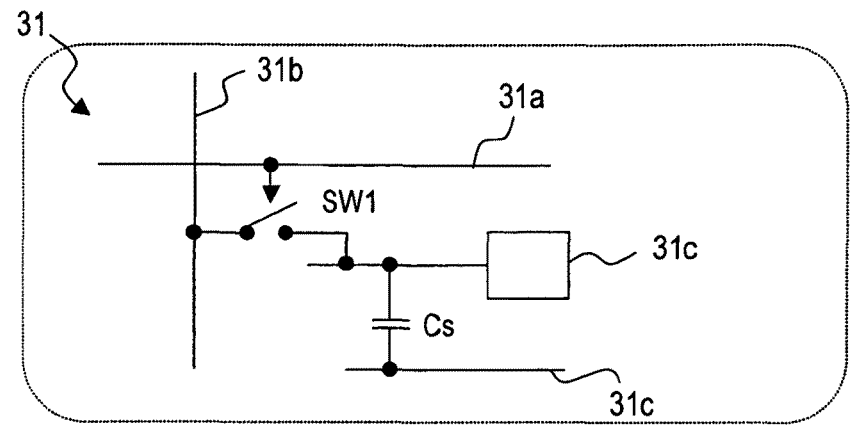
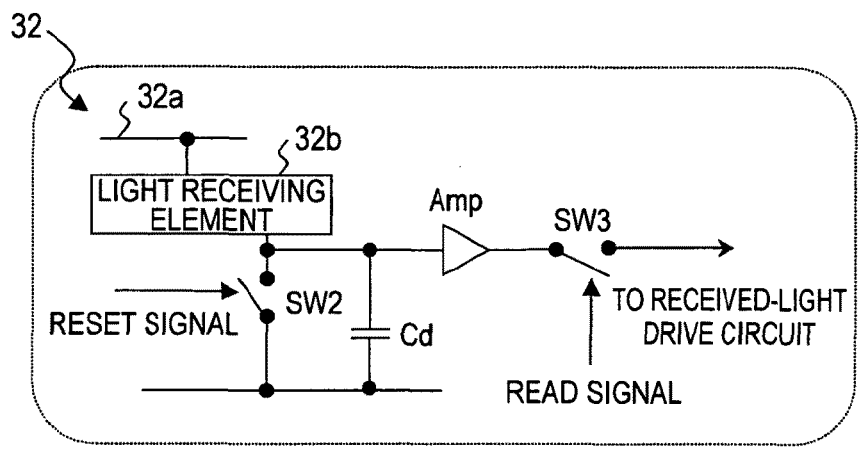
FIG.4
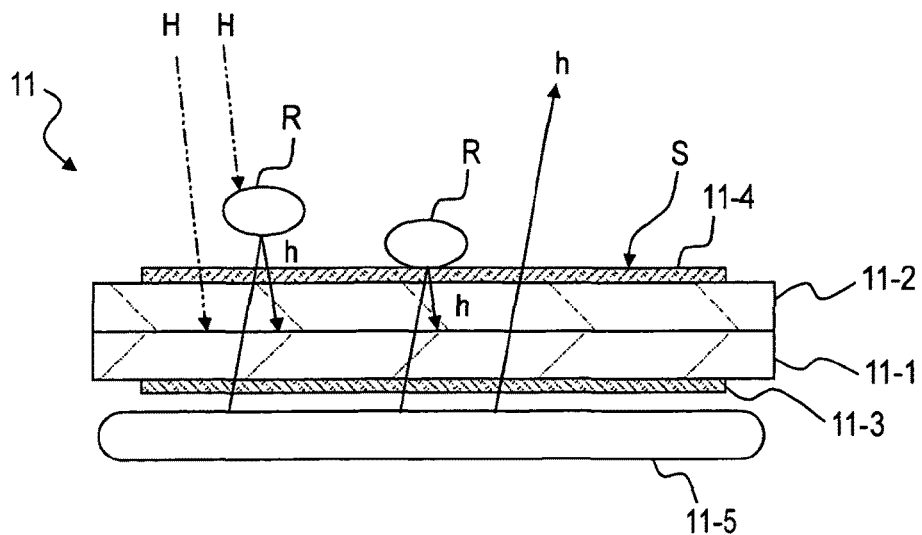

IMAGE RECOGNITION METHOD, IMAGE RECOGNITION APPARATUS AND IMAGE INPUT/OUTPUT APPARATUS

BACKGROUND OF THE INVENTION

1. Field of the Invention

The present invention relates to an image recognition method, image recognition apparatus, and image input/output apparatus, and, more particularly, to a method for recognizing a dynamic image, an apparatus that executes the method, and image input/output apparatus having an image input function for executing such an image recognition method, and a display function.

2. Description of the Related Art

As a display apparatus with an image input function for recognizing an image near a display surface, for example, a display apparatus which has light receiving elements provided adjacent to display pixels is proposed. In the display apparatus with such a configuration, noise originating from a change in external environment and/or the internal configuration greatly influences the precision of recognition of a received light image input.

There has been proposed a method of calculating the difference between the amount of received light which is measured with the display surface being luminous and the amount of received light which is measured with the display surface being not luminous, as fixed noise produced in a received light image, storing the noise as a initial value, and subtracting the initial value from a later received light image. According to the method, even in acquiring a received light image, the difference between the amount of received light which is measured with the display surface being luminous and the amount of received light which is measured with the display surface being not luminous is calculated, and the noise (initial value) is subtracted from the calculated value. This method can ensure proper contact of a detection target with the display surface or determination of proximity of a detection target thereof without being influenced by the use environment and/or the internal configuration. (See JP-A-2007-25796 (Patent Document 1).)

SUMMARY OF THE INVENTION

However, such a method needs to acquire a received light image without placing a detection target near the display surface intentionally at the time of setting the initial value or noise component. This makes it difficult to cope with a change in an environment where the display apparatus is used, and a time-dependent change in noise.

The Patent Document 1 describes that setting of the initial value may be executed before shipping a product, or a user may update the initial value as needed. While the update of the initial value as needed can cope with a environmental change and a time-dependent change in noise to some degree of extent, it is bothersome because user's operation is needed.

Thus, it is therefore desirable to provide an image recognition method which does not depend on a time-dependent change in noise originating from the external environment and/or the internal configuration of the apparatus, and can accurately recognize a subject in proximity of or in contact with the light receiving surface, and an image recognition apparatus and image input/output apparatus which execute the image recognition method.

According to an embodiment of the present invention, there is provided an image recognition method which is executed in the following procedures. First, in a first step, n-th received light data is acquired at light receiving elements arranged in a matrix form on a light receiving surface. In a next, second step, (n+1)-th received light data is acquired at the light receiving elements. In a subsequent third step, differential data resulting from subtraction of the n-th received light data acquired from the (n+1)-th received light data acquired is calculated. In a fourth step, image recognition is carried out based on the differential data. Then, the first to fourth steps are repeatedly executed.

According to another embodiment of the present invention, there is provided an image recognition apparatus which executes the foregoing image recognition method. The image recognition apparatus includes a light receiving surface where light receiving elements are arranged in a matrix form, and a drive section that repeatedly executes acquisition of received light data at the light receiving elements. The image recognition apparatus further has an image processing section that calculates differential data resulting from subtraction of n-th received light data acquired from (n+1)-th received light data acquired, and carries out image recognition based on the differential data.

According to a further embodiment of the present invention, there is provided an image input/output apparatus which executes the foregoing image recognition method, and has the aforementioned light receiving elements arranged on a display surface to effect image display.

According to the foregoing image recognition method, differential data resulting from subtraction of previously acquired (n-th) received light data from latest ((n+1)-th) received light data is calculated. Accordingly, time-dependent noise which occurs in latest received light data originating from a change in the external environment (brightness, temperature or the like) of the light receiving surface and/or the internal configuration of the apparatus provided with light receiving elements is removed from the differential data by the previous received light data. Therefore, execution of image recognition based on such differential data can ensure image recognition free of the aforementioned time-dependent noise without executing a special operation.

As described above, the present invention can ensure image recognition free of a time-dependent noise which occurs in received light data originating from a change in the external environment of the light receiving surface and/or the internal configuration of the apparatus provided with light receiving elements, without requiring executing a special operation. Consequently, it is possible to stably and accurately recognize a detection target in proximity of or in contact with the light receiving surface without requiring a user's special operation.

BRIEF DESCRIPTION OF THE DRAWINGS

FIG. 3 is a circuit diagram showing one example of a light receiving circuit disposed in the display area of the I/O display panel;

FIG. 4 is a diagram showing the panel structure of the I/O display panel;

DETAILED DESCRIPTION OF THE PREFERRED EMBODIMENT

Embodiments of an image recognition method, image recognition apparatus, and image input/output apparatus according to the present invention are described in detail below with reference to the accompanying drawings. To begin with, the schematic configuration of the image input/output apparatus having image recognition means is described, followed by the description of the image recognition method image which is executed by the image input/output apparatus as a characteristic part thereof.

<Configuration of Image Input/output Apparatus>

Figure 1:
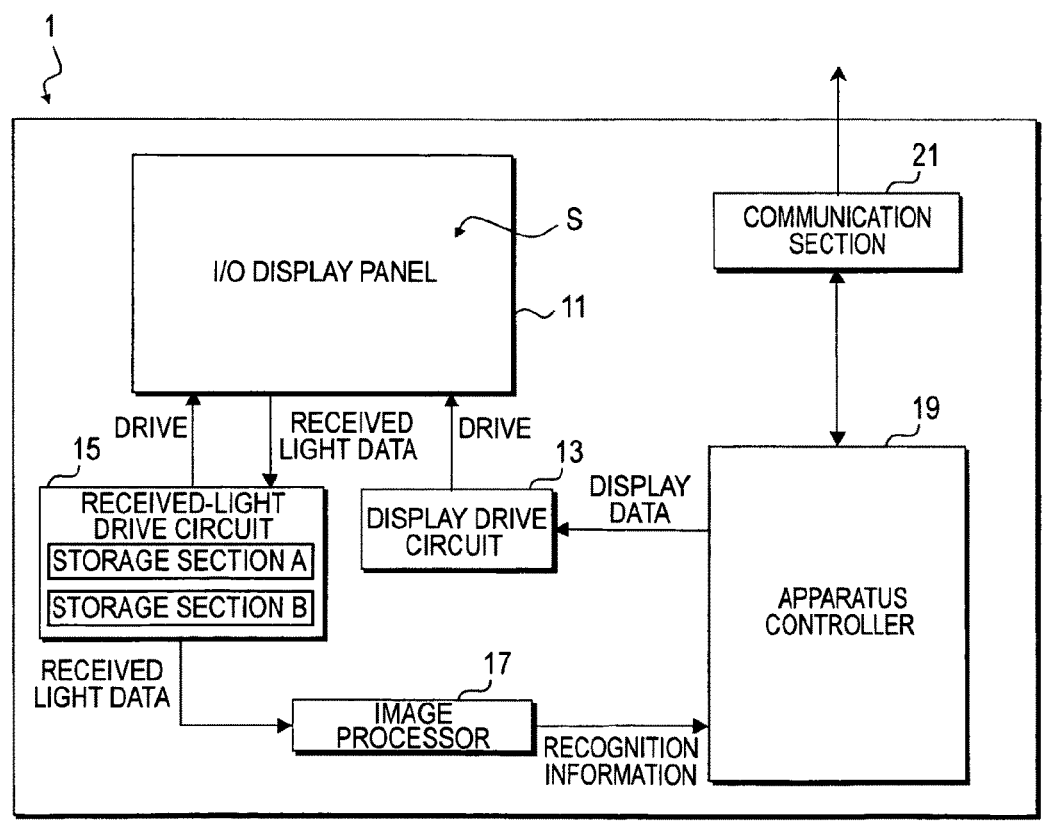
FIG. 1 is a schematic configurational diagram of an image input/output apparatus according to an embodiment of the invention.

FIG. 1 shows the schematic configurational of an image input/output apparatus 1. The image input/output apparatus 1 shown in FIG. 1 is a portable apparatus having, for example, a display function and a received-light input function. The image input/output apparatus 1 includes an I/O (Input/Output) display panel 11 having both the display function and received-light input function, a display drive circuit 13, a received-light drive circuit 15, an image processor 17, an apparatus controller 19 which executes an application program, and a data communication section 21.

The I/O display panel 11, which will be described later in detail, has a display surface that effects image display and serves as a light receiving surface. Light receiving elements are arranged on the display/light receiving surface S in a matrix form. Accordingly, light reflected at a detection target in proximity of or in contact with the display/light receiving surface S or the shadow of the detection target is detected.

In the image input/output apparatus 1 with such a I/O display panel 11, when display data output from the apparatus controller 19 is input to the display drive circuit 13, display on the I/O display panel 11 is carried out based on the input display data.

Received light data input from the I/O display panel 11 is output to the received-light drive circuit 15 to be sequentially stored therein, and is then output to the image processor 17. The image processor 17 analyzes positional information, area information, shape information, etc. of the detection target in proximity of or in contact with the display/light receiving surface S based on the received light data, and outputs the analysis result to the apparatus controller 19 of the image input/output apparatus 1. The apparatus controller 19 performs a process based on the output result from the I/O display panel 11, and performs control on the apparatus, such as reflection of the display image on the I/O display panel 11 and external communication.

In the image input/output apparatus 1, the received-light drive circuit 15 serves as a drive section to acquire received light data at the light receiving elements provided at the I/O display panel 11.

The embodiment is characterized by the driving of the received light data by the received-light drive circuit (drive section) 15 and the procedures of an image recognition process based on the received light data in the image processor 17; the procedures will be described later in detail.

Figure 2:
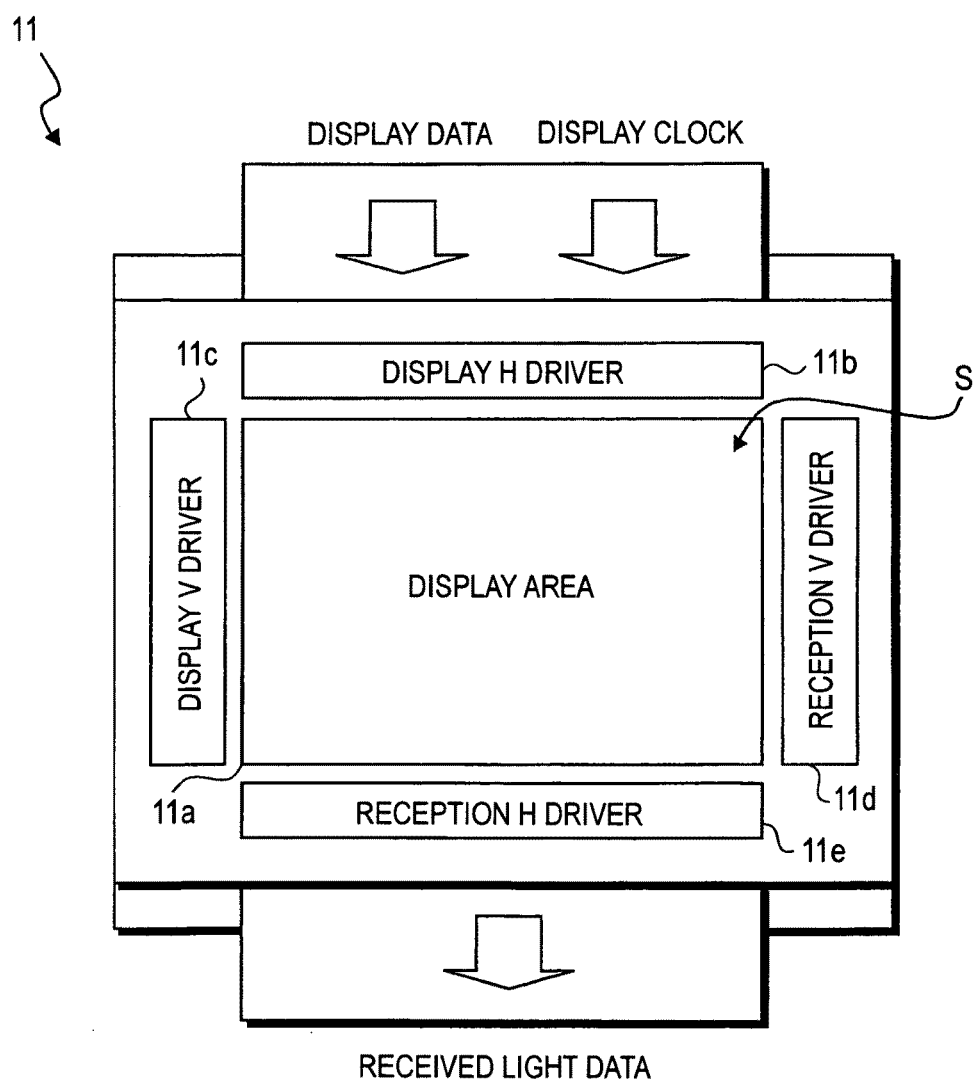
FIG. 2 is a block diagram of an I/O display panel provided in the image input/output apparatus according to the embodiment.

FIG. 2 presents a block diagram of the I/O display panel 11. The I/O display panel 11 shown in the diagram is, for example, a liquid crystal display (LCD) panel having a plurality of pixels arranged in a center display area 11a in a matrix form, and has a function (display function) of displaying an image, such as a predetermined figure or character, based on the display data while executing a line sequential operation. The I/O display panel 11 is provided with a backlight as a light source, which is turned on or off at a predetermined timing synchronous with the operational timing of the I/O display panel 11. As will be described later, the light receiving elements are arranged in the display area 11a in a matrix form to provide a light receiving function (imaging function) to detect an object in proximity of or in contact with the display/light receiving surface S of the I/O display panel 11.

A display H driver 11b, a display V driver 11c, a reception V driver 11d, and a reception H driver 11e are respectively arranged on the four sides of the display area 11a to control the driving in the horizontal (H) direction and the vertical (V) direction of the display area 11a. The display H driver 11b and the display V driver 11c are supplied with a display signal as display data and a control clock to drive the display pixels arranged in the display area 11a in a matrix form. The reception V driver 11d and the reception H driver 11e are supplied with a read clock to supply a received light signal, read out in synchronism with the clock, to the received-light drive circuit 15.

FIG. 3 shows an example of display pixel circuits 31 and light receiving circuits 32 each including a light receiving element, both disposed in the display area 11a.

The display pixel circuit 31 has a display selection line 31a laid out in the horizontal direction and a display signal line 31*b* laid out in the vertical direction, for example, with a switching element SW1 disposed at the intersection of the lines 31*a* and 31*b*. The switching element SW1 is connected with a pixel electrode 31*c* and a capacitive element Cs, and is turned on or off by a signal acquired via the display selection line 31*a*. When the switching element SW1 is ON, a pixel voltage is applied to the pixel electrode 31*c* based on a signal supplied via the display signal line 31*b* to thereby drive a liquid crystal layer.

The light receiving circuits 32 may be disposed in the display area 11*a* at predetermined portions to correspond to the respective display pixel circuits 31, or one light receiving circuit 32 may be provided for a plurality of display pixel circuits 31. The light receiving circuit 32 has a power source line 32*a* laid out, for example, in the horizontal direction, with a light receiving element 32*b* connected to the power source line 32*a*. Each light receiving element 32*b* is connected with a reset switch SW2 and a capacitive element Cd, and is further connected with a read switch SW3 via an amplifier Amp. A voltage proportional to a charge which is reset by the reset switch SW2 and then photoelectrically converted by the light receiving element 32*b* is output to the outside via the amplifier Amp at a timing when the read switch SW3 is turned on.

FIG. 4 shows the panel structure of the I/O display panel 11. As shown in the diagram, the I/O display panel 11 configured using a liquid crystal display panel has a liquid crystal layer (not shown) held between two transparent substrates 11-1 and 11-2, and has deflecting plates 11-4 and 11-5 provided outside the transparent substrates 11-1 and 11-2, respectively. The display pixel circuit 31 and the light receiving circuit 32 which have been described referring to FIG. 3 are provided on that side of the transparent substrate 11-1 which is opposite to the display/light receiving surface S and faces the liquid crystal layer. A backlight 11-5 is provided outside the transparent substrate 11-1 via the deflecting plate 11-3.

This I/O display panel 11 displays an image with the backlight 11-5 turned on to enable display light h. At this time, of the display light h which has been emitted from the backlight 11-5 and passed the deflecting plate 11-3, the display light h that has passed the liquid crystal layer set in a predetermined alignment state by driving of the pixel electrodes provided in the display circuit passes through the transparent substrate 11-2 and the deflecting plate 11-4 to be emitted from the display/light receiving surface S to display an image.

Meanwhile, the display light h which is reflected at a detection target R in proximity of or in contact with the display/light receiving surface S is detected at the light receiving element provided in the light receiving circuit 32. Further, a shadow which is produced as external light H input from the display/light receiving surface S is blocked by the detection target R is detected at the light receiving element provided in the light receiving circuit 32. Based on the detected received light data, image recognition of the detection target R is carried out in the following procedures.

<<Image Recognition Method-1>>

Figure 5:
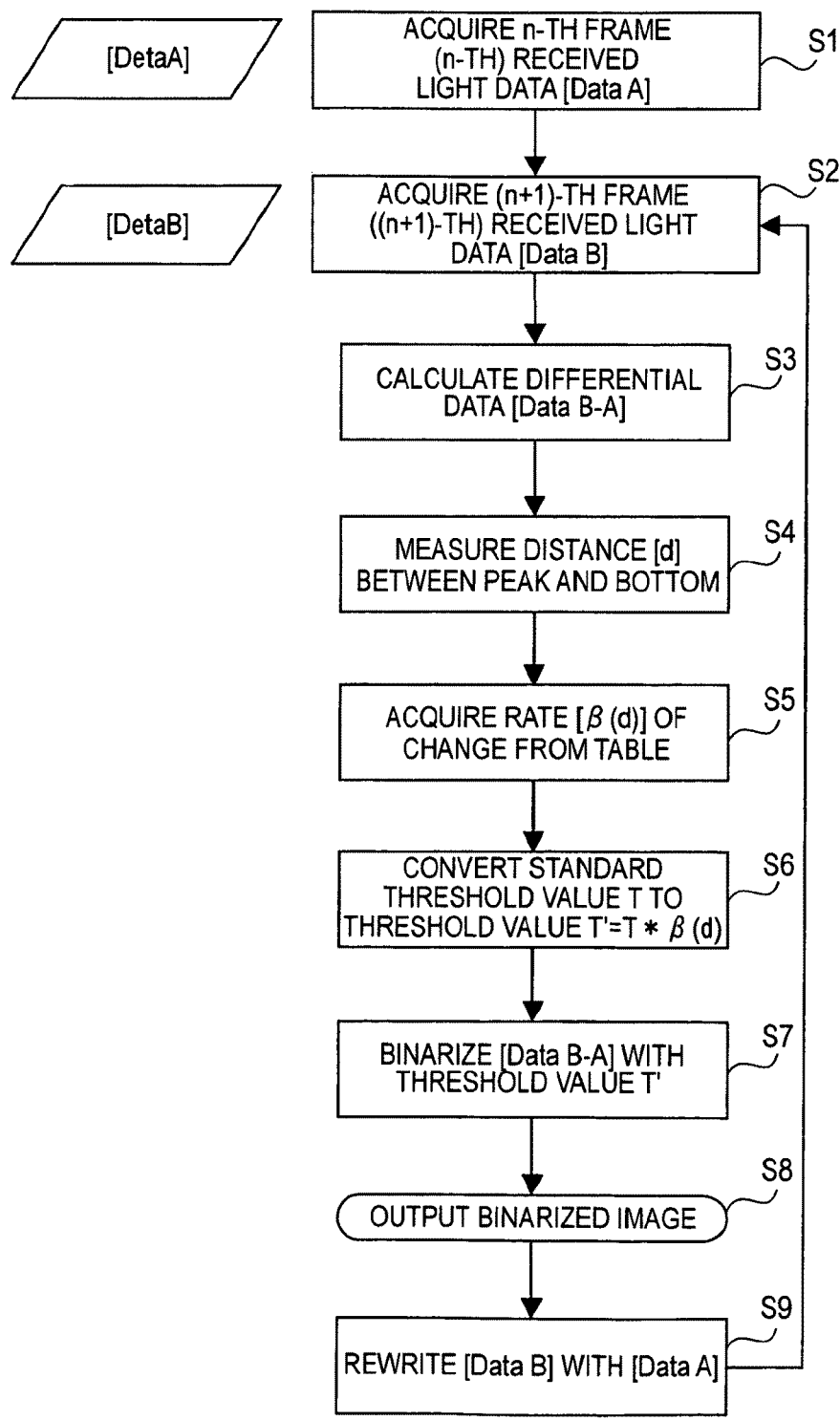
FIG. 5 is a flowchart illustrating a first example of an image recognition method which is executed by the image input/output apparatus.

FIG. 5 is a flowchart illustrating a first example of an image recognition method which is executed by the image input/output apparatus with the foregoing configuration. The first example of the image recognition method is described below referring to the flowchart in FIG. 5 and FIGS. 1 and 4, and referring to other diagrams as needed. The description is given of an exemplified case where the image of a detection target R in proximity of or in contact with the display/light receiving surface S is recognized by detecting the display light h reflected at the detection target R.

First, in step S1, n-th frame (n-th) received light data [Data A] is acquired. Here, a received light signal of the first frame received at the light receiving elements arranged at the display/light receiving surface S in a matrix form is acquired as the n-th (n=1) received light data by the received-light drive circuit (drive section) 15. At this time, the outputs of the light receiving elements are scanned over the entire display/light receiving surface S to acquire a single image.

Figure 6:
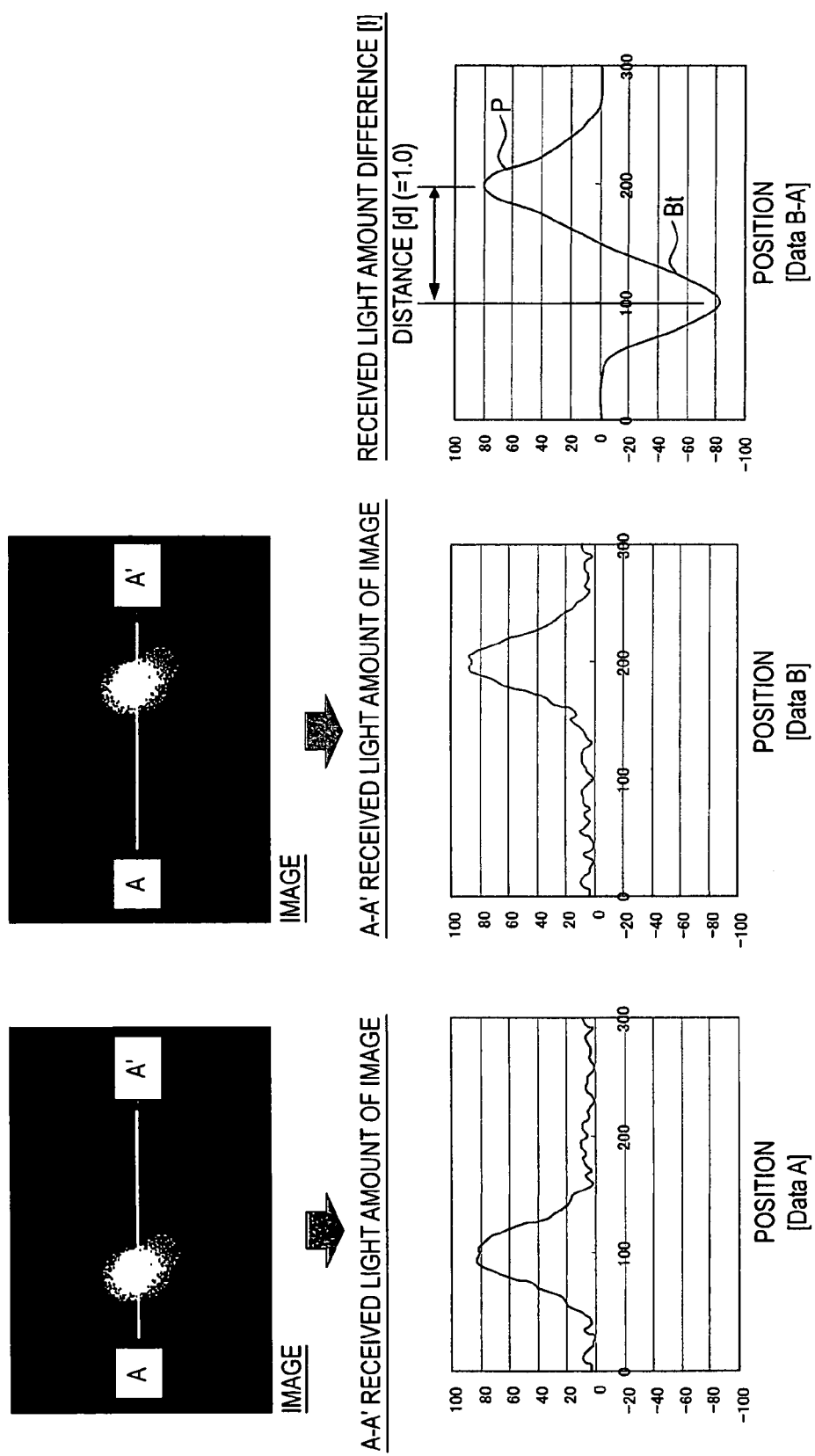
FIG. 6 is a diagram showing received light data received at light receiving elements, and differential data.

Suppose that a single image shown in [Data A] in FIG. 6 has been acquired. For the sake of simplicity, attention is given to received light data [Data A] of a line of signals (amount of received light) of A-A' in the image. The received light amount shows that noise of the light receiving elements is present all over, and its signal level is added to become higher at the position where the detection target R is present. At this time, it is understood that the detection target R is present near the left center of the n-th frame (n-th) image.

The received light data [Data A] acquired in the above way is stored in a storage section A of the received-light drive circuit (drive section) 15.

In next step S2, (n+1)-th frame ((n+1)-th) received light data [Data B] is acquired. Here, a received light signal of the second frame received at the light receiving elements arranged at the display/light receiving surface S in a matrix form is acquired as the (n+1)-th (n+1=2) received light data by the received-light drive circuit (drive section) 15. At this time, the outputs of the light receiving elements are scanned over the entire display/light receiving surface S to acquire a single image.

Suppose that a single image shown in [Data B] in FIG. 6 has been acquired. For the sake of simplicity, attention is given to received light data [Data B] of a line of signals (amount of received light) of A-A' in the image. The received light amount shows that noise of the light receiving elements is present all over, and its signal level is added to become higher at the position where the detection target R is present. At this time, it is understood that the detection target R is moved near the right center of the (n+1)-th frame ((n+1)-th) image.

The acquired received light data [Data B] is stored in a storage section B of the received-light drive circuit (drive section) 15.

In next step S3, differential data [Data B-A] resulting from subtraction of n-th received light data [Data A] acquired from (n+1)-th received light data [Data B] acquired is calculated. [Data B-A] in FIG. 6 shows this differential data [Data B-A]. The differential data [Data B-A] is data from which noise in the sequentially acquired received light data [Data B] and received light data [Data A] is canceled. The latest (n+1)-th received light data [Data B] acquired appears as a peak P, and the n-th received light data [Data B] acquired previously appears as a bottom Bt.

In next step S4 and subsequent steps, image recognition is executed based on the differential data [Data B-A].

Before executing image recognition according to the procedures of step S4 and subsequent steps, creation of a data conversion table needed in the image recognition is described.

<Creation of Data Conversion Table>

First, as a first phenomenon, the sizes of the absolute values of the peak P and bottom Bt in the aforementioned differential data [Data B-A] change depending on the moving distance of a detection target R in the display/light receiving surface S in a range where the moving distance is near. The moving distance of the detection target R is the interval between the peak position of the received light data [Data A] and the peak position of the received light data [Data B], and is equivalent to a distance between the peak P and the bottom Bt.

That is, as shown in FIG. 6, when the peak positions of the received light amounts in the received light data [Data A], [Data B] are sufficient apart from each other within a certain range, the peaks do not interfere with each other in the differential data [Data B-A]. Therefore, the absolute values of the peak P and bottom Bt in the differential data [Data B-A] do not depend on the distance [d] between the peak P and the bottom Bt, and become substantially equal to the values of the peaks in the received light data [Data A], [Data B].

Figure 7:
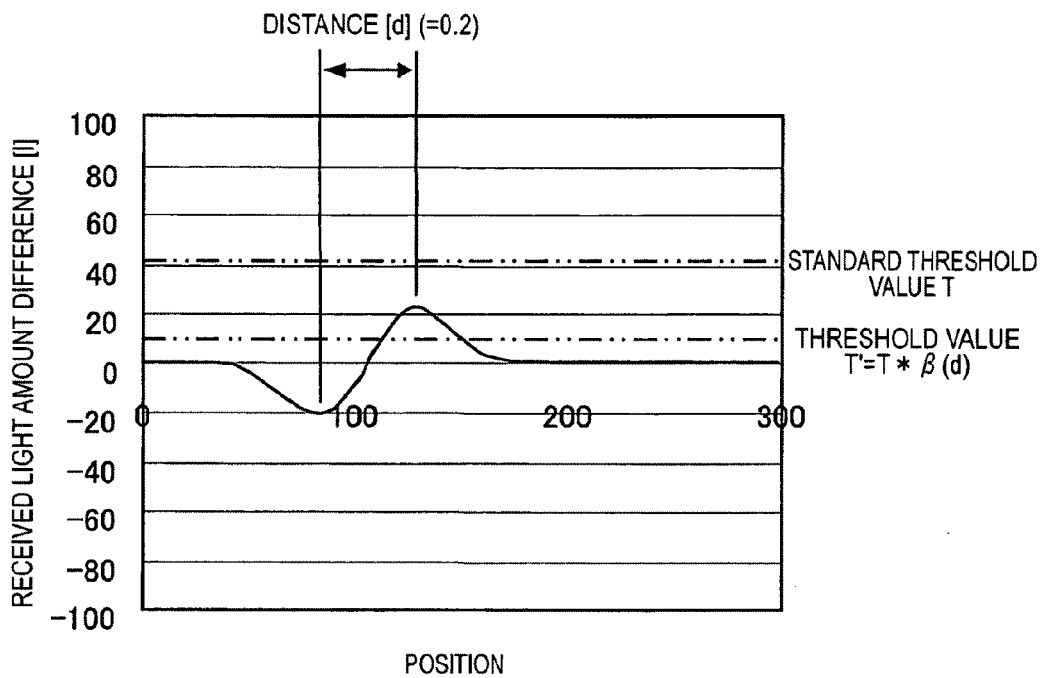
FIG. 7 is a diagram showing setting of a threshold value in differential data.

When the interval between the peak positions of the received light data [Data A], [Data B] is small, on the other hand, as shown in FIG. 7, the peaks interfere with each other in the differential data [Data B-A]. Accordingly, the absolute values of the peak P and bottom Bt in the differential data [Data B-A] depend on the distance [d] between the peak P and the bottom Bt, and become smaller than the values of the peaks in the received light data [Data A], [Data B].

Figure 8:
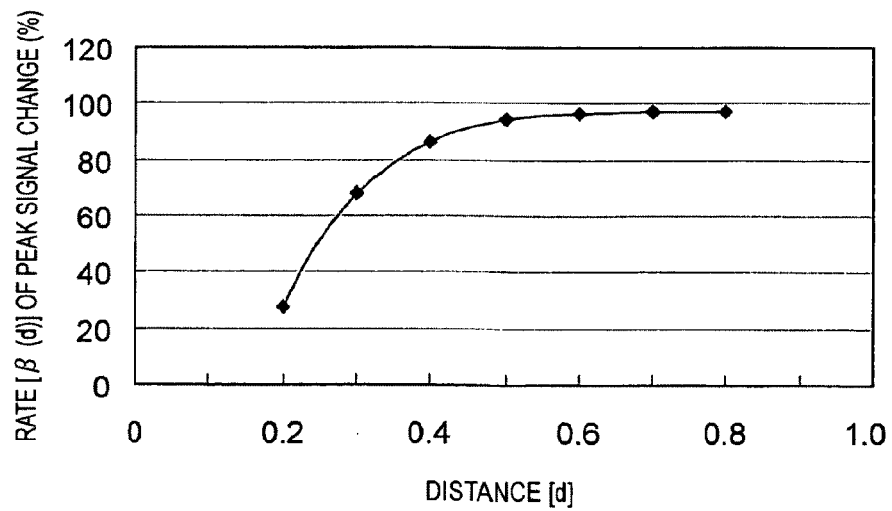
FIG. 8 is a diagram showing the relationship between a distance [d] and a rate [β(d)] of change in peak signal amount.

Within a range where the distance [d] between the peak P and the bottom Bt in the differential data [Data B-A] becomes a certain value, as shown in FIG. 8, a rate [β(d)] of change in peak signal amount depends on the distance [d] and increases. In FIG. 8, the peak signal amount in an area where the absolute values of the peak P and bottom Bt do not depend on the distance [d] between the peak P and the bottom Bt (i.e., the distance between the peak positions of the received light data [Data A], [Data B]) as shown in FIG. 6, for example, is 100%.

Figure 9:
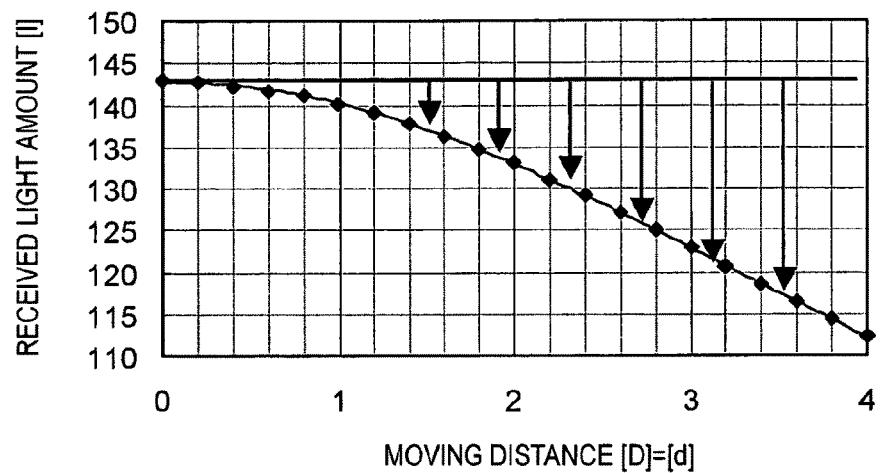
FIG. 9 is a diagram showing the relationship between a moving distance [D] of a detection target R and the amount of received light at the light receiving elements within one frame.

Next, as a second phenomenon, when a detection target R is moving fast in the display/light receiving surface S, the time that the detection target R is present on each light receiving element becomes shorter. As shown in FIG. 9, therefore, the received light amount at each light receiving element decreases depending on the moving distance [D] of the detection target R in one frame. It is to be noted that the moving distance [D] corresponds to the distance [d] between the peak P and the bottom Bt. The received light amount corresponds to the rate [β(d)] of change in received light amount.

Figure 10:
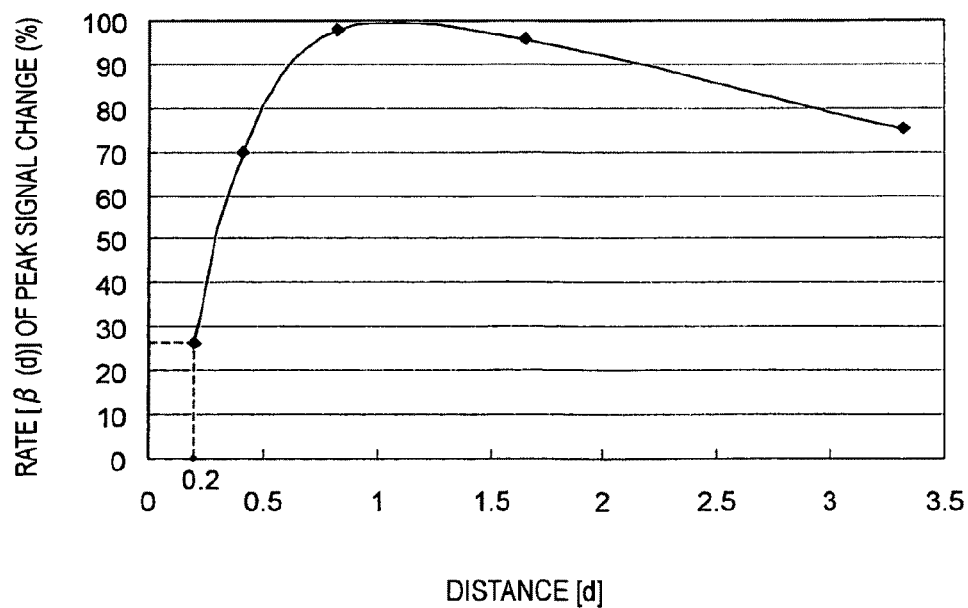
FIG. 10 is a diagram of a data conversion table which is the combination of FIGS. 8 and 9.

In this respect, a data conversion table shown in FIG. 10 which is the combination of the first phenomenon and the second phenomenon is created beforehand. The data conversion table is the combination of the rate [β(d)] of change in peak signal amount which occurs in the differential data [Data B-A] shown in FIG. 8 and a change in received light amount at the light receiving elements which depends on the moving distance [D] of the detection target R shown in FIG. 9.

In next step S4 illustrated in the flowchart in FIG. 5, the distance [d] between the peak P and the bottom Bt is measured from the differential data [Data B-A] calculated in step S3. In the case of the differential data [Data B-A] shown in FIG. 7, for example, the distance [d] is measured to be 0.2.

In next step S5, the rate [β(d)] of change in peak signal amount (=27.5%) in the differential data [Data B-A] is acquired based on the data conversion table in FIG. 10 obtained beforehand and the distance [d] (=0.2) measured in step S4.

Thereafter, in step S6, a standard threshold value T for binarizing the differential data [Data B-A] is converted to a threshold value T'=T×β(d) according to the rate [β(d)] of change in peak signal amount (=27.5%) acquired in step S5. It is assumed here that the standard threshold value T is the position or so of, for example, the half value width of the rate [β(d)] of change in peak signal amount (=100%), and T=40. Accordingly, the standard threshold value T is converted to the threshold value T'=T×[β(d)]$^{-1}$=40×0.275=11 (see FIG. 7).

Next, in step S7, the differential data [Data B-A] is binarized with the set threshold value T', and the peak signal amount equal to or greater than the threshold value T' is 1 while the peak signal less than the threshold value T' is 0.

In step S8, the binarized data is output as image information to detect the position, size and shape of the detection target R in the display/light receiving surface S.

In next step S9, the received light data [Data A] is replaced with the (n+1)-th frame ((n+1=2)-th) received light data [Data B] to be stored in the storage section A of the received-light drive circuit 15. In addition, n is replaced with n+1.

Thereafter, the flow returns to step S2 and the processes of steps S2 to S9 are repeated in order during which acquisition of received light data at the light receiving elements is repeatedly executed by driving the received-light drive circuit (drive section) 15.

The processes of steps S1 to S9 are executed by the image processor 17.

According to the first example of the method, differential data [Data B-A] which is the latest ((n+1)-th) received light data [Data B] from which the previously acquired (n-th) received light data [Data A] is subtracted is calculated. Therefore, the differential data [Data B-A] is data such that time-dependent noise occurring in the latest received light data [Data B] originating from a change in the external environment (brightness, temperature or the like) of the portable image input/output apparatus 1 with the display/light receiving surface S and/or the internal configuration of the image input/output apparatus 1 is removed by the previous received light data [Data A].

Therefore, executing image recognition based on the differential data [Data B-A] makes it possible to execute high-precision image recognition with the time-dependent noise stably removed, without performing a special operation. This method is particularly effective in detecting the image of a detection target R which moves in the X-Y direction in the display/light receiving surface S.

<<Image Recognition Method-2>>

Figure 11:
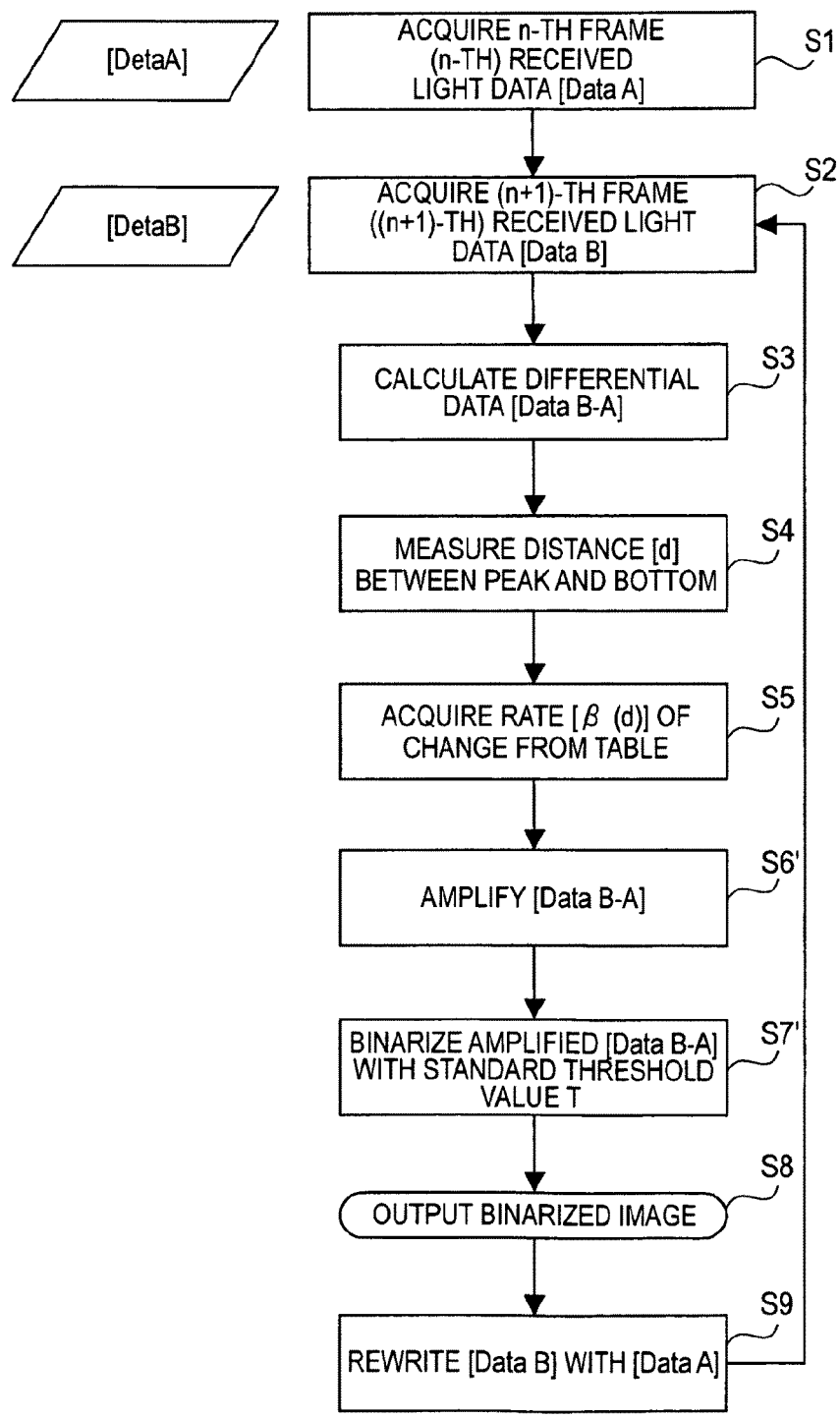
FIG. 11 is a flowchart illustrating a second example of the image recognition method which is executed by the image input/output apparatus.

FIG. 11 is a flowchart illustrating a second example of the image recognition method which is executed by the image input/output apparatus with the foregoing configuration. The procedures of the second example in this flowchart differ from those of the first example described referring to the flowchart in FIG. 5 in steps S6' and S7' for binarizing differential data [Data B-A], and the other steps S1 to S5, S8 and S9 are the same. The second example of the image recognition method is described below referring to the flowchart in FIG. 11, and referring to other diagrams as needed. Same step numbers are given to the same processes as given in the flowchart in FIG. 5 to simplify the description.

First, steps S1 to S5 are executed in the same way as done in the first example.

That is, n-th received light data [Data A] is acquired in step S1, (n+1)-th received light data [Data B] is acquired in step S2, and differential data [Data B-A] is calculated in step S3. Next, in step S4, the distance [d] (=0.2) between the peak P and the bottom Bt is measured from the differential data [Data B-A].

In next step S5, the rate [β(d)] of change in peak signal amount (=27.5%) in the differential data [Data B-A] isacquired based on the data conversion table in FIG. 10 obtained beforehand and the distance [d] (=0.2) measured in step S4. The data conversion table in FIG. 10 is acquired in the same way as done in the first example.

Figure 12:
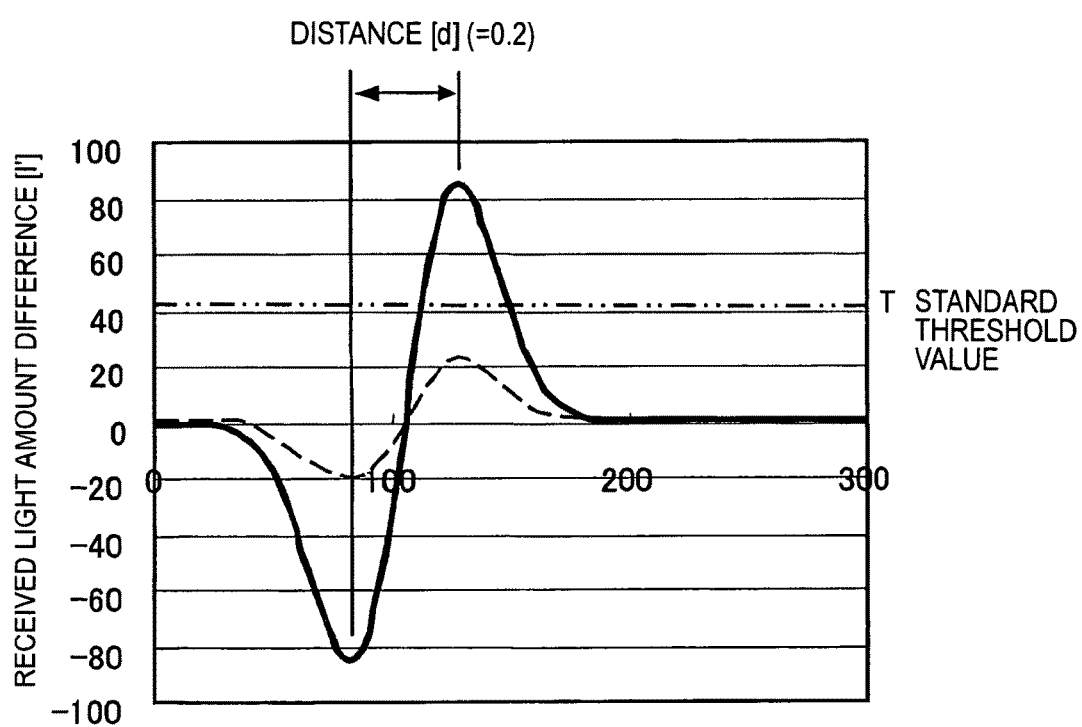
FIG. 12 is a diagram illustrating an example where a received light amount difference [I] in differential data [Data B-A] is amplified to be an amplified received light amount difference [I']

In next step S6', a received light amount difference [I] in the differential data [Data B-A] is amplified based on the rate [β(d)] of change acquired in step S5 to yield an amplified received light amount difference [I'] as shown in FIG. 12. At this time, for example, amplified received light amount difference [I']=received light amount difference [I]×(1÷[β(d)]).

Next, in step S7', the differential data [Data B-A] with the amplified received light amount difference [I'] is binarized, and the peak signal amount equal to or greater than the standard threshold value T is 1 while the peak signal less than the standard threshold value T is 0.

Next, steps S8 and S9 are executed in the same way as done in the first example. First, in step S8, the binarized data is output as image information. In step S9, the received light data [Data A] is replaced with the (n+1)-th frame (n+1=2) received light data [Data B] to be stored in the storage section A of the received-light drive circuit 15. In addition, n is replaced with n+1.

Thereafter, the flow returns to step S2 and the processes of steps S2 to S9 are repeated in order during which acquisition of received light data at the light receiving elements is repeatedly executed by driving the received-light drive circuit (drive section) 15.

The processes of steps S1 to S6' and S7' to S9 are executed by the image processor 17.

According to the second example of the method, differential data [Data B-A] which is the latest ((n+1)-th) received light data [Data B] from which the previously acquired (n-th) received light data [Data A] is subtracted is also calculated. As in the first example, therefore, executing image recognition based on the differential data [Data B-A] makes it possible to execute high-precision image recognition with the time-dependent noise stably removed, without performing a special operation. This method is particularly effective in detecting the image of a detection target R which moves in the X-Y direction in the display/light receiving surface S.

<<Image Recognition Method-3>>

Figure 13:
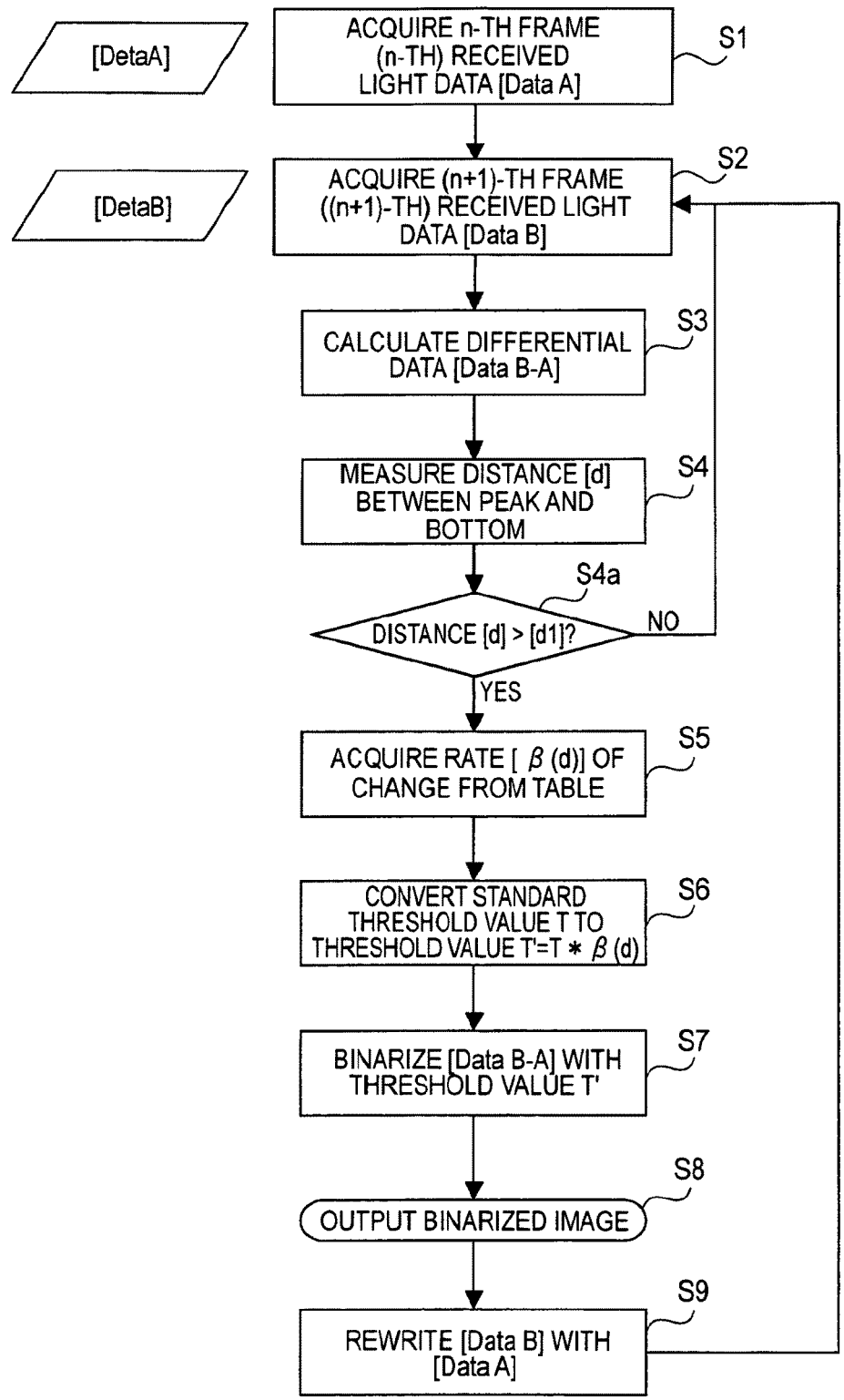
FIG. 13 is a flowchart illustrating a third example of the image recognition method which is executed by the image input/output apparatus.

FIG. 13 is a flowchart illustrating a third example of the image recognition method which is executed by the image input/output apparatus with the foregoing configuration. The procedures of the third example in this flowchart differ from those of the first example described referring to the flowchart in FIG. 5 in that step S4a for making a determination on the distance [d] is added between step S4 and step S5. The third example of the image recognition method is described below referring to the flowchart in FIG. 13, and referring to other diagrams as needed. Same step numbers are given to the same processes as given in the flowchart in FIG. 5 to simplify the description.

First, steps S1 to S4 are executed in the same way as done in the first and second examples.

That is, n-th received light data [Data A] is acquired in step S1, (n+1)-th received light data [Data B] is acquired in step S2, and differential data [Data B-A] is calculated in step S3. Next, in step S4, the distance [d] between the peak P and the bottom Bt is measured from the differential data [Data B-A].

Thereafter, in the additional step S4a, it is determined whether or not the distance [d] between the peak P and the bottom Bt measured in step S4 is greater than a predetermined distance [d1]. When the moving distance of the detection target R in the display/light receiving surface S, i.e., the distance [d] between the peak P and the bottom Bt in the differential data [Data B-A] is extremely small, the level of the output signal of the peak P in the differential data [Data B-A] becomes small, making the detection difficult.

Only when it is determined in step S4a that the distance [d] between the peak P and the bottom Bt is greater than the predetermined distance [d1] (Yes), the flow moves to step S5. Thereafter, steps S5 to S9 are executed in the same way as done in the first example.

That is, first, in step S5, the rate [β(d)] of change in peak signal amount in the differential data [Data B-A] is acquired based on the data conversion table in FIG. 10 obtained beforehand and the distance [d] measured in step S4. The data conversion table in FIG. 10 is acquired in the same way as done in the first example.

In next step S6, the standard threshold value T for binarizing the differential data [Data B-A] is converted to the threshold value T'=T×β(d) according to the rate [β(d)] of change in peak signal amount (=27.5%) acquired in step S5.

Next, in step S7, the differential data [Data B-A] is binarized with the set threshold value T'.

In step S8, the binarized data is output as image information.

Further, in step S9, the received light data [Data A] is replaced with the received light data [Data B], and n is replaced with n+1 after which the flow returns to step S2.

When it is determined in step S4a that the distance [d] between the peak P and the bottom Bt is not greater than the predetermined distance [d1] (No), on the other hand, the flow returns to step S2 to acquire the (n+1)-th received light data [Data B] again. That is, the (n+1)-th received light data [Data B] is acquired repeatedly until it is determined in step S4a that the distance [d] between the peak P and the bottom Bt which occur in the differential data [Data B-A] is greater than the predetermined distance [d1]. Only when it is determined that the distance [d] between the peak P and the bottom Bt is greater than the predetermined distance [d1], the flow goes to subsequent steps S5 to S9 to use the then acquired received light data [Data B] as image information.

When it is determined in step S4a that the distance [d] between the peak P and the bottom Bt is not greater than the predetermined distance [d1] (No), the binarized data output previously may be kept output, considering that the detection target R has not moved with respect to the display/light receiving surface S.

The processes of steps S4a to S9 are executed by the image processor 17.

According to the third example of the method, differential data [Data B-A] which is the latest ((n+1)-th) received light data [Data B] from which the previously acquired (n-th) received light data [Data A] is subtracted is also calculated. As in the first example, therefore, executing image recognition based on the differential data [Data B-A] makes it possible to execute high-precision image recognition with the time-dependent noise stably removed, without performing a special operation. This method is particularly effective in detecting the image of a detection target R which moves in the X-Y direction in the display/light receiving surface S.

Further, according to the third example of the method, with the new step S4a added, only when it is determined that the distance [d] between the peak P and the bottom Bt which occur in the differential data [Data B-A] is greater than the predetermined distance [d1], the then acquired received light data [Data B] is used as image information. Accordingly, When the moving distance of the detection target R in the display/light receiving surface S, i.e., the distance [d] between the peak P and the bottom Bt in the differential data [Data B-A] is extremely small, and the level of the output signal of the peak P in the differential data [Data B-A] is not sufficient, the received light data [Data B] is not used and the previously output binarized data is kept output to ensure image recognition which prevents output data from being lost.

<<Image Recognition Method-4>>

Figure 14:
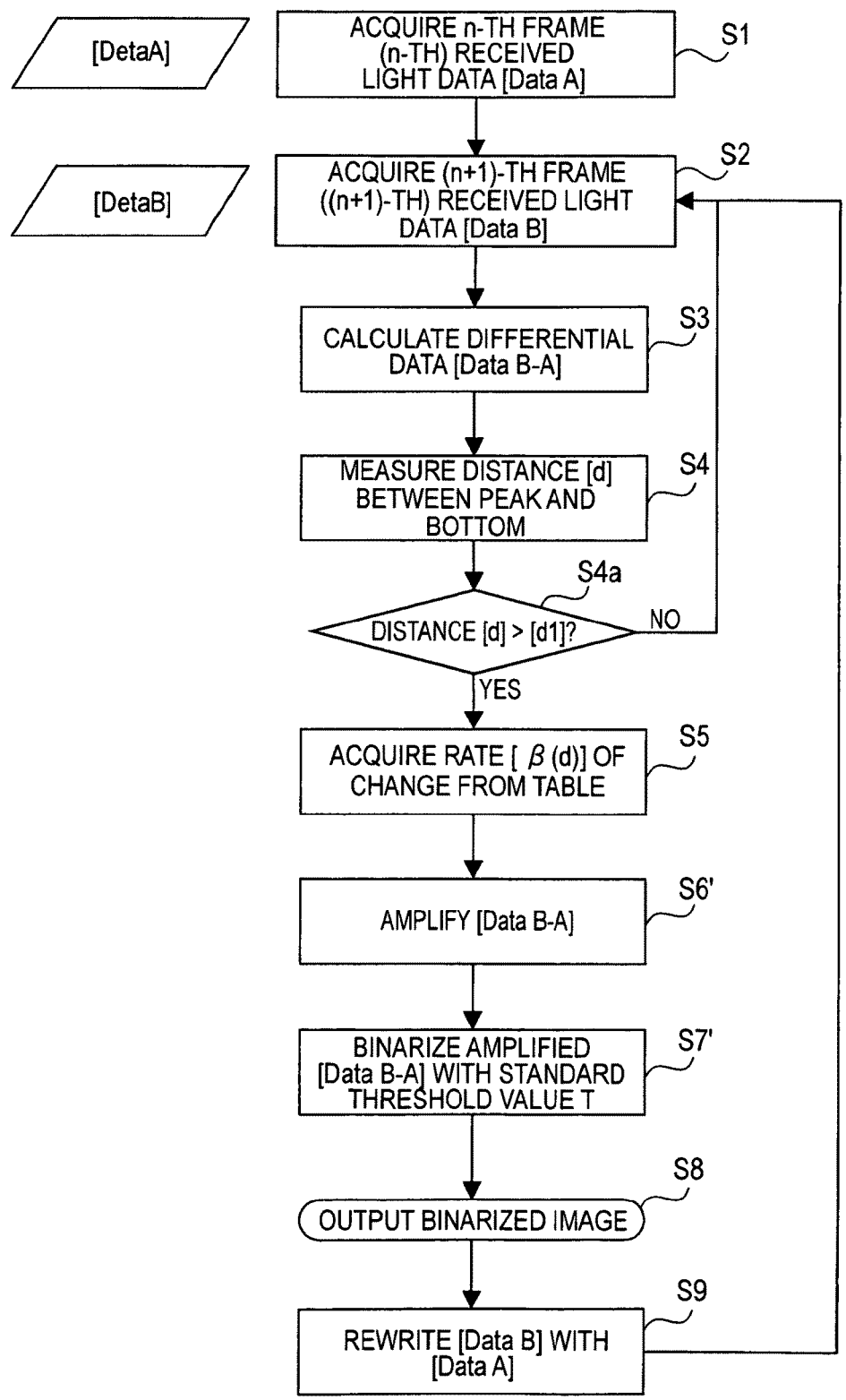
FIG. 14 is a flowchart illustrating a fourth example of the image recognition method which is executed by the image input/output apparatus.

FIG. 14 is a flowchart illustrating a fourth example of the image recognition method which is executed by the image input/output apparatus with the foregoing configuration. The procedures of the fourth example in this flowchart are the procedures of the third example adapted to the second example, and the procedures of the second example described referring to the flowchart in FIG. 11 to which step S4a added to the third example is added. The other steps S1 to S6' and S7' to S9 excluding step S4a are the same as those of the second example. The fourth example of the image recognition method is described below referring to the flowchart in FIG. 14, and referring to other diagrams as needed. Same step numbers are given to the same processes as given in the previously referred flowcharts to simplify the description.

First, steps S1 to S4 are executed in the same way as done in the first to third examples.

That is, n-th received light data [Data A] is acquired in step S1, (n+1)-th received light data [Data B] is acquired in step S2, and differential data [Data B-A] is calculated in step S3. Next, in step S4, the distance [d] between the peak P and the bottom Bt is measured from the differential data [Data B-A].

Thereafter, in the additional step S4a, it is determined whether or not the distance [d] between the peak P and the bottom Bt measured in step S4 is greater than a predetermined distance [d1]. When the moving distance of the detection target R in the display/light receiving surface S, i.e., the distance [d] between the peak P and the bottom Bt in the differential data [Data B-A] is extremely small, the level of the output signal of the peak P in the differential data [Data B-A] becomes small, making the detection difficult.

Only when it is determined in step S4a that the distance [d] between the peak P and the bottom Bt is greater than the predetermined distance [d1] (Yes), therefore, the flow moves to step S5.

First, it is desirable to execute step S5 as per the first example to acquire the rate [β(d)] of change in peak signal amount in the differential data [Data B-A] based on the data conversion table in FIG. 10 obtained beforehand and the distance [d] measured in step S4. The data conversion table in FIG. 10 is acquired in the same way as done in the first example.

In next step S6', a received light amount difference [I] in the differential data [Data B-A] is amplified based on the rate [β(d)] of change acquired in step S5 to yield an amplified received light amount difference [I'] as shown in FIG. 12. The amplification procedure is the same as that of step S6' of the second example.

Next, in step S7', the differential data [Data B-A] with the amplified received light amount difference [I'] is binarized, and the peak signal amount equal to or greater than the standard threshold value T is 1 while the peak signal less than the standard threshold value T is 0.

In step S8, the binarized data is output as image information.

Further, in step S9, the received light data [Data A] is replaced with the received light data [Data B], and n is replaced with n+1 after which the flow returns to step S2.

When it is determined in step S4a that the distance [d] between the peak P and the bottom Bt is not greater than the predetermined distance [d1] (No), on the other hand, the flow returns to step S2 to acquire the (n+1)-th received light data [Data B] again. That is, the (n+1)-th received light data [Data B] is acquired repeatedly until it is determined in step S4a that the distance [d] between the peak P and the bottom Bt which occur in the differential data [Data B-A] is greater than the predetermined distance [d1]. Only when it is determined that the distance [d] between the peak P and the bottom Bt is greater than the predetermined distance [d1], the flow goes to subsequent steps S5 to S9 to use the then acquired received light data [Data B] as image information.

When it is determined in step S4a that the distance [d] between the peak P and the bottom Bt is not greater than the predetermined distance [d1] (No), the binarized data output previously may be kept output, considering that the detection target R has not moved with respect to the display/light receiving surface S, as per the third example.

The processes of steps S4a to S9 are executed by the image processor 17.

According to the fourth example of the method, it is also possible to execute high-precision image recognition with the time-dependent noise stably removed, without performing a special operation, as per the third example. The addition of step S4a can ensure image recognition which prevents output data from being lost even when the moving distance of the detection target R in the display/light receiving surface S is small.

<<Image Recognition Method-5>>

Figure 15:
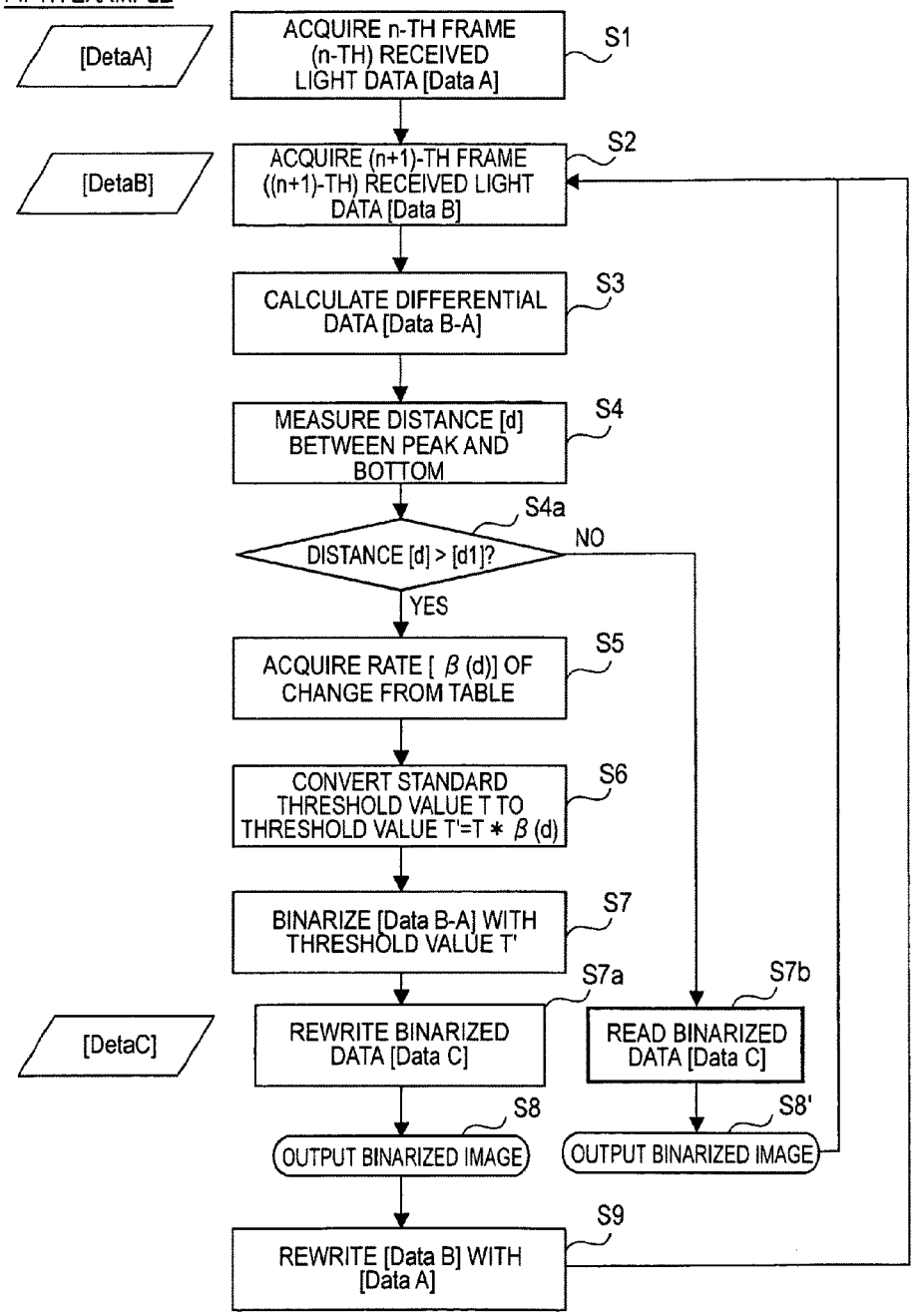
FIG. 15 is a flowchart illustrating a fifth example of the image recognition method which is executed by the image input/output apparatus.

FIG. 15 is a flowchart illustrating a fifth example of the image recognition method which is executed by the image input/output apparatus with the foregoing configuration. The procedures of the fifth example in this flowchart are the procedures of the third example described referring to the flowchart in FIG. 13 to which steps S7a, S7b and S8' are further added. The fifth example of the image recognition method is described below referring to the flowchart in FIG. 15, and referring to other diagrams as needed. Same step numbers are given to the same processes as given in the previously referred flowcharts to simplify the description.

First, steps S1 to S4 are executed in the same way as done in the first to fourth examples.

That is, n-th received light data [Data A] is acquired in step S1, (n+1)-th received light data [Data B] is acquired in step S2, and differential data [Data B-A] is calculated in step S3. Next, in step S4, the distance [d] between the peak P and the bottom Bt is measured from the differential data [Data B-A].

Thereafter, in step S4a, it is determined whether or not the distance [d] between the peak P and the bottom Bt measured in step S4 is greater than a predetermined distance [d1] as per the third example. Only when it is determined in step S4a that the distance [d] between the peak P and the bottom Bt is greater than the predetermined distance [d1] (Yes), the flow moves to step S5.

In step S5, the rate [β(d)] of change in peak signal amount in the differential data [Data B-A] is acquired based on the data conversion table in FIG. 10 obtained beforehand and the distance [d] measured in step S4. The data conversion table in FIG. 10 is acquired in the same way as done in the first example.

In next step S6, the standard threshold value T for binarizing the differential data [Data B-A] is converted to the threshold value T'=T×β(d) according to the rate [β(d)] of change in peak signal amount (=27.5%) acquired in step S5.

Next, in step S7, the differential data [Data B-A] is binarized with the set threshold value T'.

Thereafter, in the newly added step S7a, binarized data acquired in step S7 is stored as binarized data [Data C]. When the binarized data [Data C] has been stored already, the binarized data acquired in step S7 is written over as new binarized data [Data C].

In next step S8, the new binarized data stored or written over in step S7a is output as binarized data [Data C].

Further, in step S9, the received light data [Data A] is replaced with the received light data [Data B], and n is replaced with n+1 after which the flow returns to step S2.

When it is determined in step S4a that the distance [d] between the peak P and the bottom Bt is not greater than the predetermined distance [d1] (No), on the other hand, the flow returns to the newly added step S7b.

In step S7b, the binarized data [Data C] stored already is read out.

In next step S8', the binarized data [Data C] read out in step S7b is output as image information. Thereafter, the flow returns to step S2 to acquire the (n+1)-th received light data [Data B] again. Accordingly, the (n+1)-th received light data [Data B] is acquired repeatedly until it is determined in step S4a that the distance [d] between the peak P and the bottom Bt which occur in the differential data [Data B-A] is greater than the predetermined distance [d1]. Only when it is determined that the distance [d] between the peak P and the bottom Bt is greater than the predetermined distance [d1], the flow goes to subsequent steps starting at step S5.

According to the fifth example of the method, it is also possible to execute high-precision image recognition with the time-dependent noise stably removed, without performing a special operation, as per the third example. The addition of step S4a can ensure image recognition which prevents output data from being lost even when the moving distance of the detection target R in the display/light receiving surface S is small. Especially, adding steps S7b and S8' to read latest stored binarized data [Data C] can implement more natural image recognition in the fifth example.

The procedures of the fifth example can be adapted to the foregoing fourth example. In this case, the above-described step S7a is added after step S7' in the flowchart in FIG. 14 illustrating the procedures of the fourth example. In addition, the above-described steps S7b and S8' have only to be added between step S4a and step S2 in the flowchart in FIG. 14 in order from step S4a side, thereby providing advantages similar to those of the fifth example.

<<Image Recognition Method-6>>

Figure 16:
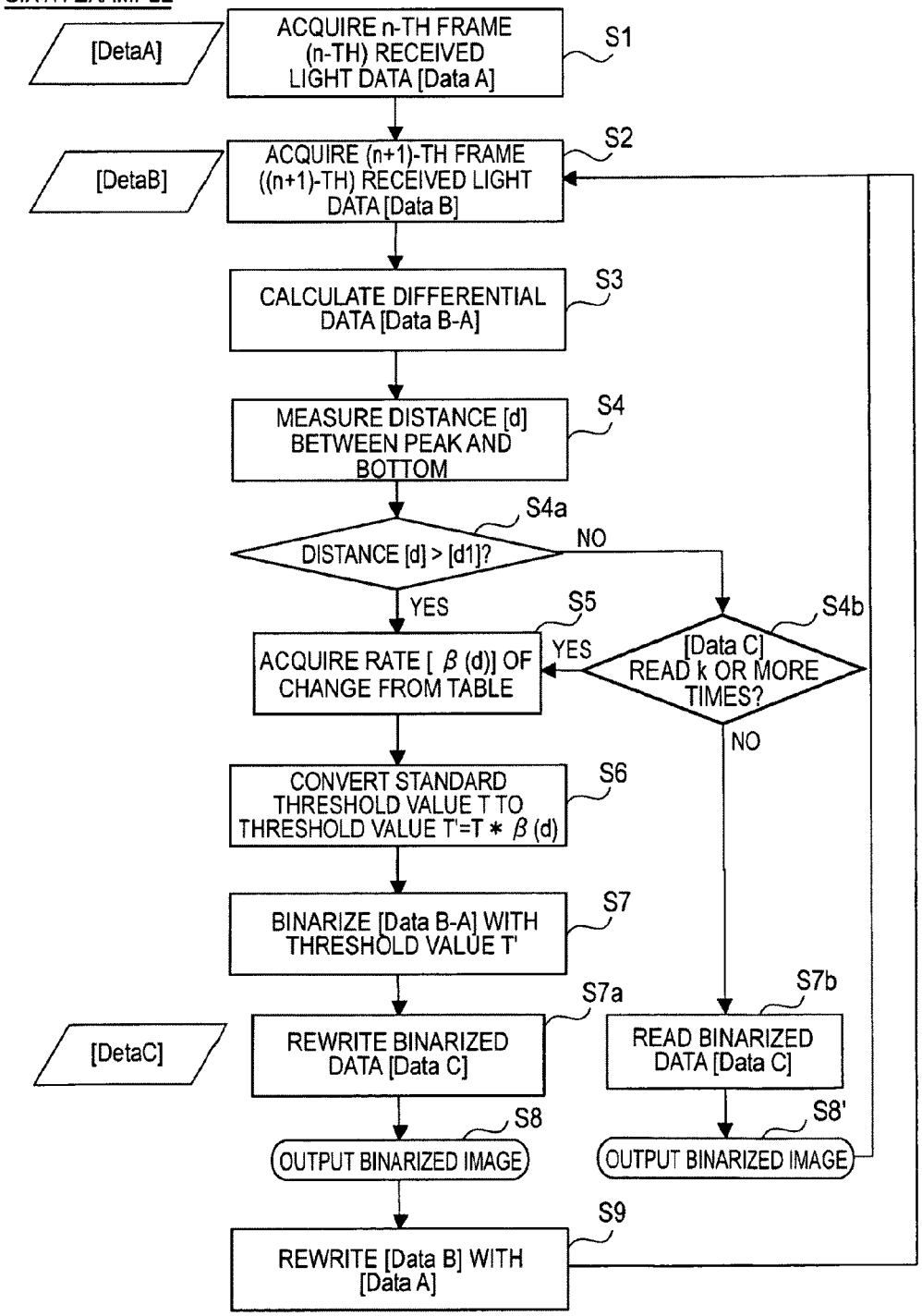
FIG. 16 is a flowchart illustrating a sixth example of the image recognition method which is executed by the image input/output apparatus.

FIG. 16 is a flowchart illustrating a sixth example of the image recognition method which is executed by the image input/output apparatus with the foregoing configuration. The procedures of the sixth example in this flowchart are the procedures of the fifth example described referring to the flowchart in FIG. 15 to which determination in step S4b is further added. The sixth example of the image recognition method is described below referring to the flowchart in FIG. 16, and referring to other diagrams as needed. Same step numbers are given to the same processes as given in the previously referred flowcharts to simplify the description.

First, steps S1 to S4, and steps S5 to S9 to which the flow moves when it is determined in next step S4a that the distance [d] between the peak P and the bottom Bt is greater than the predetermined distance [d1] (Yes) are executed in the same way as done in the fifth example.

When it is determined in step S4a that the distance [d] between the peak P and the bottom Bt is not greater than the predetermined distance [d1] (No), on the other hand, the flow moves to the newly added step S4b.

In step S4b, it is determined whether or not the number of times the binarized data [Data C] is read out is equal to or greater than k. Here, the number of times the binarized data [Data C] is read out is the number of times the binarized data [Data C] is read out in next step S7b, and is the number of times the same binarized data [Data C] is read out.

In step S4b, it is determined that the number of times the binarized data [Data C] is read out is not equal to or greater than k (No), the flow moves to next step S7b to read the stored binarized data [Data C].

In next step S8', the binarized data [Data C] read out in step S7b is output as image information. Thereafter, the flow returns to step S2 to acquire the (n+1)-th received light data [Data B] again.

When it is determined in step S4b that the number of times the binarized data [Data C] is read out is equal to or greater than k (Yes), on the other hand, the flow moves to step S5. Then, the rate [β(d)] of change in peak signal amount is acquired based on the distance [d] measured in the previous step S4, and step S6 and the subsequent steps are executed in the same way as described above. That is, when the number of times the binarized data [Data C] or the previously acquired image information is used consecutively reaches the predetermined number k, next image information is acquired based on the previously acquired binarized data [Data B].

According to the sixth example of the method, it is also possible to execute high-precision image recognition with the time-dependent noise stably removed, without performing a special operation, as per the third example. The addition of step S4a can ensure image recognition which prevents output data from being lost even when the moving distance of the detection target R in the display/light receiving surface S is small. Especially, in the sixth example, adding steps S7b and S8' to read latest stored binarized data [Data C] can implement more natural image recognition as per the fifth example. Furthermore, in the sixth example, with step S4b being added, when the number of times the stored binarized data [Data C] is used consecutively reaches the predetermined number k, next image information is acquired based on the previously acquired binarized data [Data B]. This can ensure more natural image recognition.

The procedures of the sixth example can be adapted to the foregoing fourth example. In this case, the above-described step S7a is added after step S7' in the flowchart in FIG. 14 illustrating the procedures of the fourth example. In addition, the above-described steps S4b, S7b and S8' have only to be added between step S4a and step S2 in the flowchart in FIG. 14 in order from step S4a side, thereby providing advantages similar to those of the sixth example.

Figure 17:
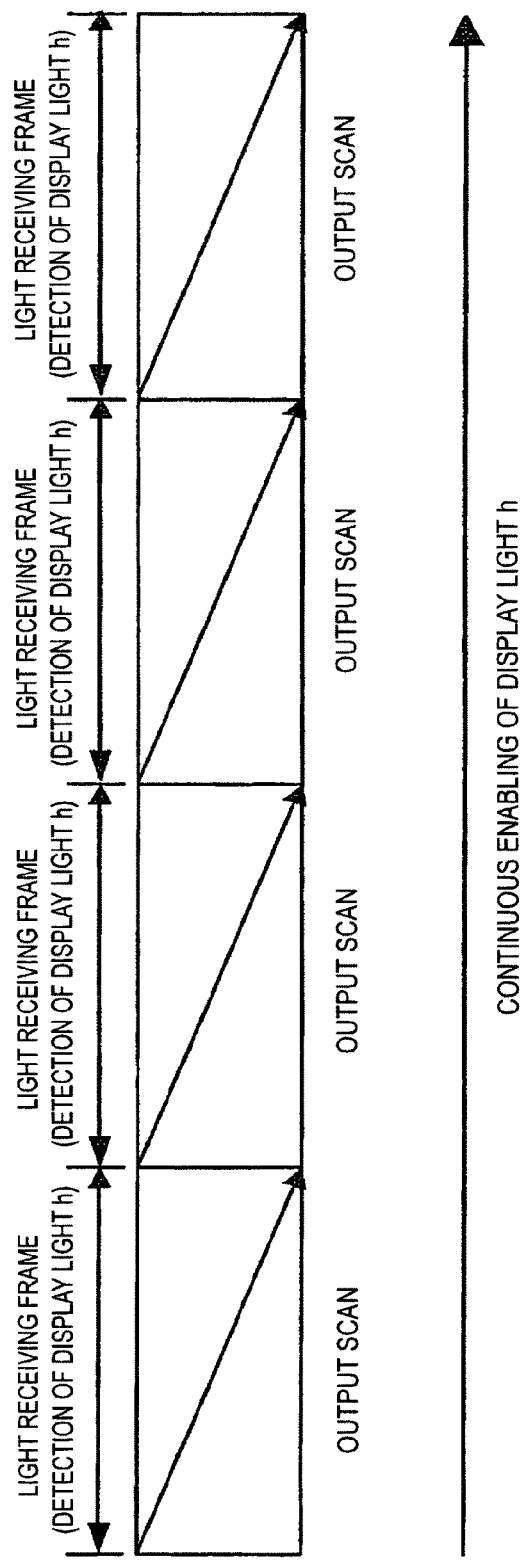
FIG. 17 is a diagram showing an example of the timing of outputting received light data from the light receiving elements.

The foregoing descriptions of the procedures of the first to sixth examples have been given of the case where the image of a detection target R in proximity of or in contact with the display/light receiving surface S is recognized by detecting the display light h reflected at the detection target R. That is, as shown in FIG. 17, with the display light h being enabled, the outputs of the light receiving elements over the entire display/light receiving surface S in one light receiving frame are scanned to detect the display light h reflected at the detection target R.

In this respect, in step S6, the standard threshold value T for binarizing the differential data [Data B-A] is converted to the threshold value T' according to the rate [β(d)] of change in peak signal amount (=27.5%) acquired in step S5.

However, the procedures of the first to sixth examples can be adapted to a method of recognizing the image of a detection target R by detecting external light H blocked by the detection target R.

<<First Modification>>

A description will be given of a modification in which the procedures of the first to sixth examples can be adapted to the method of recognizing the image of a detection target R by detecting external light H blocked by the detection target R. The following will describe a first modification of the first example of the image recognition method, as one example, referring to the flowchart in FIG. 5 and FIGS. 1 and 4, and referring to other diagrams as needed.

First, in step S1, n-th frame (n-th) received light data [Data A] is acquired. Here, the first received light signal received at the light receiving elements arranged at the display/light receiving surface S in a matrix form is acquired as the n-th (n=1) received light data by the received-light drive circuit (drive section) 15. At this time, the outputs of the light receiving elements are scanned over the entire display/light receiving surface S to acquire a single image.

Figure 18:
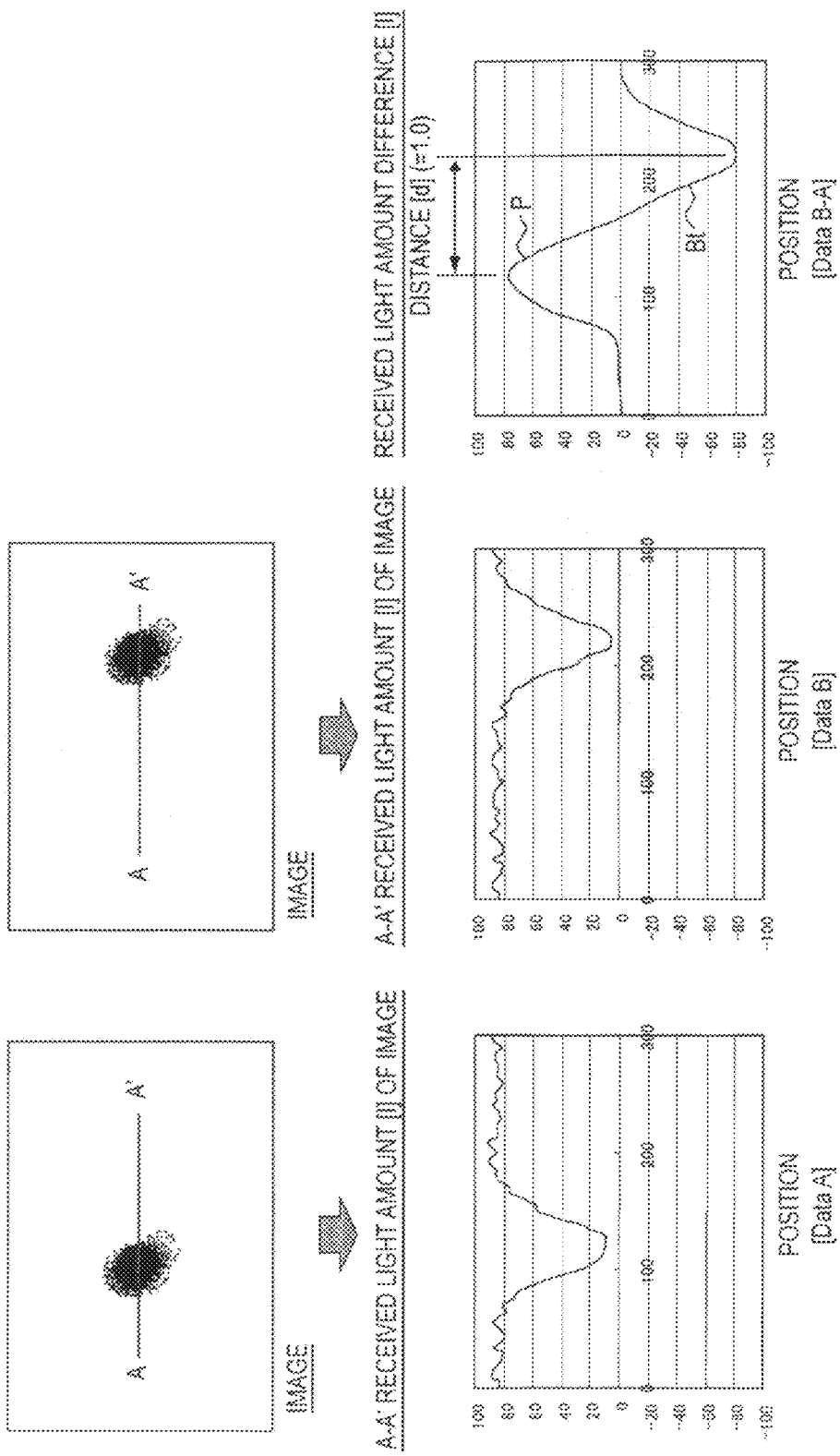
FIG. 18 is a diagram showing received light data received and differential data for explaining a first modification of the embodiment.

Suppose that a single image shown in [Data A] in FIG. 18 has been acquired. For the sake of simplicity, attention is given to received light data [Data A] of a line of signals (amount of received light) of A-A' in the image. The received light amount shows that noise of the light receiving elements is present all over, and its signal level becomes lower at the position where the detection target R is present. At this time, it is understood that the detection target R is present near the left center of the n-th (n=1) frame image.

The received light data [Data A] acquired in the above way is stored in a storage section A of the received-light drive circuit (drive section) 15.

In next step S2, (n+1)-th frame received light data [Data B] is acquired. Here, a received light signal of the second frame received at the light receiving elements arranged at the display/light receiving surface S in a matrix form is acquired as the (n+1)-th (n+1=2) received light data by the received-light drive circuit (drive section) 15. At this time, the outputs of the light receiving elements are scanned over the entire display/light receiving surface S to acquire a single image.

Suppose that a single image shown in [Data B] in FIG. 18 has been acquired. For the sake of simplicity, attention is given to received light data [Data B] of a line of signals (amount of received light) of A-A' in the image. The received light amount shows that noise of the light receiving elements is present all over, and its signal level becomes lower at the position where the detection target R is present. At this time, it is understood that the detection target R is moved near the right center of the (n+1)-th (n+1=2) image.

The acquired received light data [Data B] is stored in a storage section B of the received-light drive circuit (drive section) 15.

In next step S3, differential data [Data B-A] resulting from subtraction of the n-th received light data [Data A] acquired from the (n+1)-th received light data [Data B] acquired is calculated. [Data B-A] in FIG. 18 shows this differential data [Data B-A]. The differential data [Data B-A] is the data from which noise in the sequentially acquired received light data [Data B] and received light data [Data A] is canceled. The latest (n+1)-th received light data [Data B] acquired appears as a bottom Bt, and the latest n-th received light data [Data A] acquired previously appears as a peak P.

In next step S4 and subsequent steps, image recognition is executed based on the differential data [Data B-A].

Before executing image recognition according to the procedures of step S4 and subsequent steps, a data conversion table needed in the image recognition is created beforehand as described in the foregoing description of the previous modification.

In next step S4 illustrated in the flowchart in FIG. 5, the distance [d] between the peak P and the bottom Bt is measured from the differential data [Data B-A] calculated in step S3. In the case of the differential data [Data B-A] shown in FIG. 18, for example, the distance [d] is measured to be 1.0.

In next step S5, the rate [β(d)] of change in peak signal amount in the differential data [Data B-A] is acquired based on the data conversion table obtained beforehand and the distance [d] (=1.0) measured in step S4.

Thereafter, in step S6, the standard threshold value T for binarizing the differential data [Data B-A] is converted to the threshold value T'=T×β(d) according to the rate [β(d)] of change in peak signal amount acquired in step S5. In this example, the standard threshold value T is set negative, and is converted to a negative threshold value T' according to the rate [β(d)] of change in bottom signal amount acquired in step S5. Accordingly, the bottom which occurs in the differential data [Data B-A] is used as image information. This is the difference from the first example in which reflected light of the display light h is detected.

In the steps starting at step S7, procedures similar to those of the first example are executed to repeatedly output binarized data as image information based on the latest (n+1)-th received light data [Data B].

Because differential data [Data B-A] resulting from subtraction of previous (n-th) received light data [Data A] acquired from the latest ((n+1)-th) received light data [Data B] is calculated through detection of external light H blocked by a detection target R, as described above, it is possible to obtain advantages similar to those of the first example.

The foregoing description of the modification has been given of the case where the standard threshold value T for binarizing the differential data [Data B-A] is set negative to use a bottom which occurs in the differential data [Data B-A] as image information. However, a process of reversing the sign (±) of the differential data [Data B-A], for example, may be executed in such a way that the latest (n+1)-th received light data [Data B] acquired appears as a peak P, and the previous n-th received light data [Data A] appears as a bottom Bt. In this case, the standard threshold value T may be set positive as per the first example.

The above-described modification of recognizing the image of a detection target R by detecting external light H blocked by a detection target. R can be applied as modifications of the second to sixth examples as well as the modification of the first example. In each modification, the process needs to be executed in such a way that the latest (n+1)-th received light data [Data B] acquired appears as a peak P, and the previous n-th received light data [Data A] appears as a bottom Bt, thus providing advantages similar to those of each example.

Figure 19:
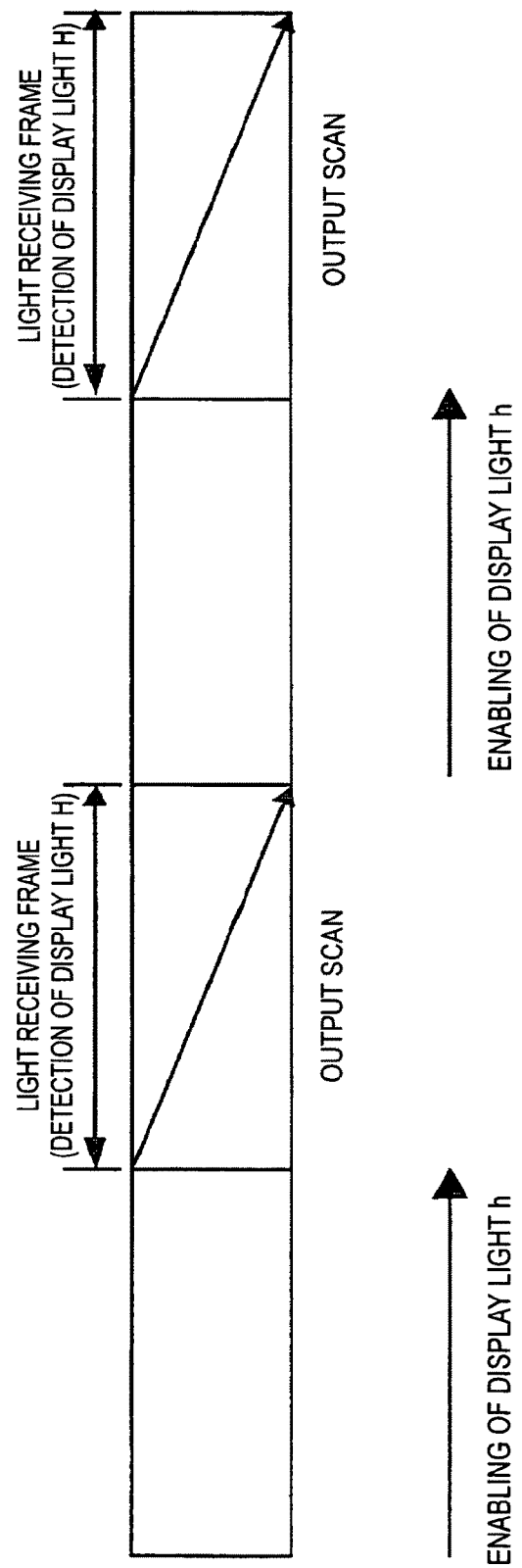
FIG. 19 is a diagram showing an example of the timing of outputting received light data from the light receiving elements according to the modification.

The foregoing description of the procedures of the modification has been given of the exemplified case where the image of a detection target R is recognized by detecting external light H blocked by a detection target R in proximity of or in contact with the display/light receiving surface S. As shown in FIG. 19, therefore, between image displays on the display/light receiving surface S with the display light h being enabled, the display light h is disabled. The external light H blocked by the detection target R is detected by scanning the outputs from the light receiving elements over the entire display/light receiving surface S in one light receiving frame in which the display light h is disabled.

<<Second Modification>>

Figure 20:
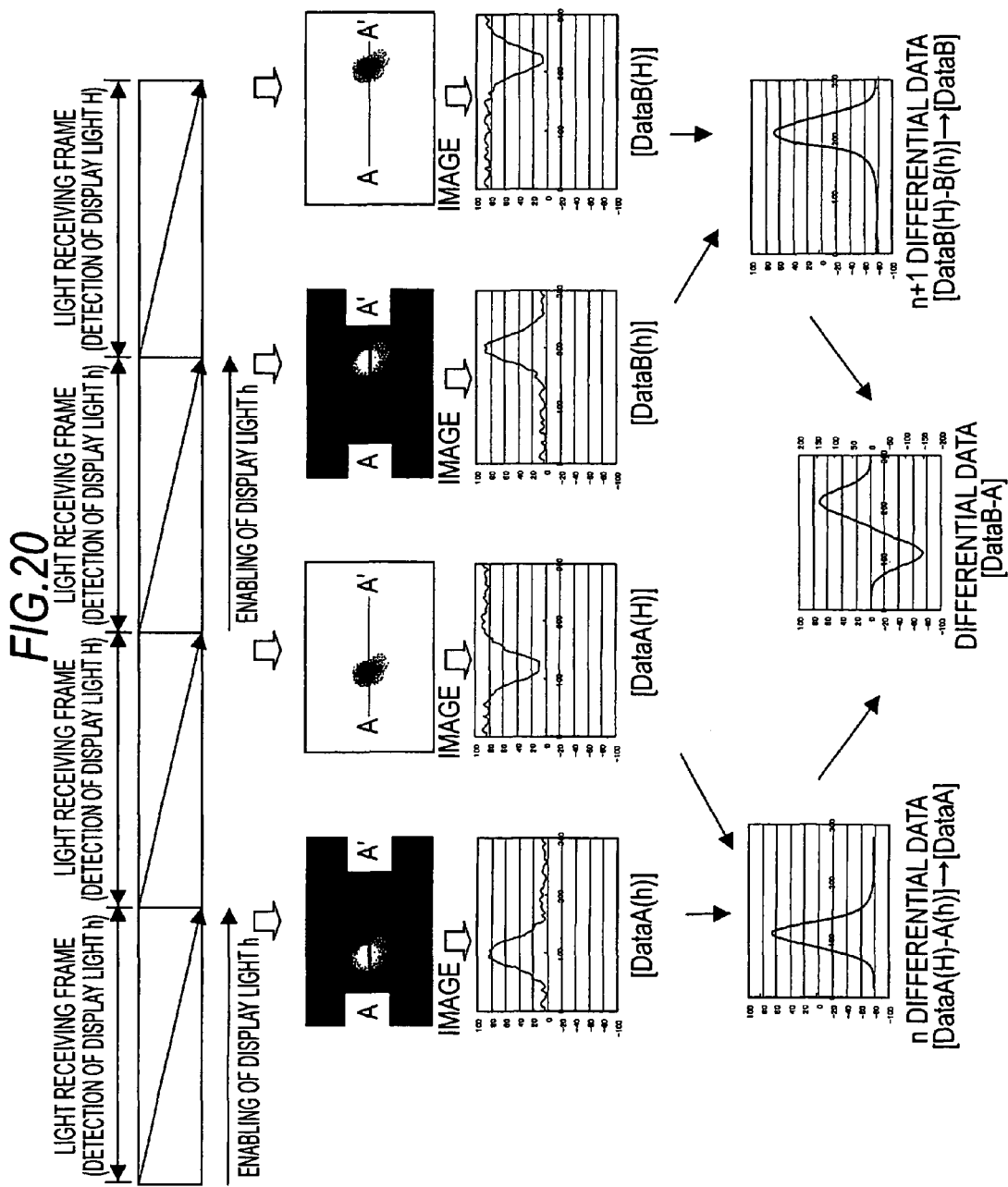
FIG. 20 is a diagram illustrating a second modification of the embodiment.

Referring to FIG. 20, a method of recognizing the image of a detection target R by detecting both display light h reflected at the detection target R and external light H blocked by the detection target R will be described as a second modification of the procedures of each of the first to sixth examples.

It is assumed that the image input/output apparatus is implementing image display with display light h flickered as shown in FIG. 20.

First, with the display light h being enabled, received light data of the display light h reflected at a detection target R is acquired as n(h)-th frame (n(h)-th) (n(h)=1) received light data [Data A(h)]. At this time, the outputs of the light receiving elements are scanned over the entire display/light receiving surface S to acquire a single image.

Suppose that a single image shown in [Data A(h)] has been acquired. For the sake of simplicity, attention is given to received light data [Data A(h)] of a line of signals (amount of received light) of A-A' in the image. The received light amount shows that noise of the light receiving elements is present all over, and its signal level becomes higher at the position where the detection target R is present. At this time, it is understood that the detection target R is present near the left center of the n(h)-th frame image relating to the display light h.

The received light data [Data A(h)] acquired in the above way is stored in the storage section of the received-light drive circuit (drive section) 15.

Next, with regard to received light data of external light H blocked by the detection target R with the display light h being disabled, received light data [Data A(H)] of an n(H)-th frame (n(H)-th) (n(H)=1) is acquired. At this time, the outputs of the light receiving elements are scanned over the entire display/light receiving surface S to acquire a single image.

Suppose that a single image shown in [Data A(H)] has been acquired. For the sake of simplicity, attention is given to received light data [Data A(H)] of a line of signals (amount of received light) of A-A' in the image. The received light amount shows that noise of the light receiving elements is present all over, and its signal level becomes lower at the position where the detection target R is present. At this time, it is understood that the detection target R is moved near the right center of the n(H)-th image relating to the external light H.

The acquired received light data [Data A(H)] is stored in the storage section of the received-light drive circuit (drive section) 15.

Then, n-th (n=1) differential data [Data A(H)−A(h)] resulting from subtraction of previously acquired n(h)-th received light data [Data A(h)] relating to the display light h from the later acquired n(H)-th received light data [Data A(H)] relating to the external light H is calculated. Then, the n-th ((n=1)-th) differential data [Data A(H)−A(h)] calculated is set as n differential data [Data A].

Received light data of the display light h reflected by the detection target R with the display light h being enabled is acquired as (n(h)+1)-th [(n(h)+1)-th] (n(h)+1=2) received light data [Data B(h)]. At this time, the outputs of the light receiving elements are scanned over the entire display/light receiving surface S to acquire a single image.

The received light data [Data B(h)] acquired in the above way is stored in the storage section of the received-light drive circuit (drive section) 15.

Next, with regard to received light data of external light H blocked by the detection target R with the display light h being disabled, (n(H)+1)-th frame ((n(H)+1)-th) (n(H)+1=2) received light data [Data B(H)] is acquired. At this time, the outputs of the light receiving elements are scanned over the entire display/light receiving surface S to acquire a single image.

The acquired received light data [Data B(H)] is stored in the storage section of the received-light drive circuit (drive section) 15.

Then, (n+1)-th (n+1=2) differential data [Data B(H)−B(h)] resulting from subtraction of previously acquired n(h)+1=second received light data [Data B(h)] relating to the display light h from the later acquired (n(H)+1)-th (n(H)+1=2) received light data [Data B(H)] relating to the external light H is calculated. Then, the (n+1)-th ((n+1)=2) differential data [Data B(H)−B(h)] calculated is set as n+1 differential data [Data B].

Next, differential data [Data B-A] resulting from subtraction of n differential data [Data A] from n+1 differential data [Data B] is calculated. The differential data [Data B-A] is data obtained by canceling noise in the received light data which is acquired twice consecutively with regard to the display light h and the external light H. The latest n+1 differential data [Data B] appears as a peak P, and the previous n differential data [Data A] appears as a bottom Bt.

Thereafter, image recognition is carried out based on the differential data [Data B-A] in procedures similar to those of the steps starting at step S4 in each of the first to sixth examples. At this time, the n differential data [Data A] is replaced with n+1 differential data [Data B]. Accordingly, binarized data is repeatedly output as image information based on the latest received light data [Data B].

As described above, even through detection of both display light h reflected at a detection target R and external light H blocked by the detection target R, with respect to the display light h and external light H, the latest differential data [Data B-A] is calculated by subtracting previously (n-th) acquired received light data [Data A(h)] and [Data A(H)] from the latest (n+1)-th received light data [Data B(h)] and [Data B(H)], and is used. This can provide advantages similar to those of each of the first to sixth examples.

The first modification can be applied to the above-described second modification. In the second modification, for example, received light data of display light h and received light data of external light H which is detected subsequently are used in calculating n differential data [Data A(H)−A(h)] and n+1 differential data [Data B(H)−B(h)]. On the contrary, however, received light data of external light H and received light data of display light h which is detected subsequently may be used in calculating n-th differential data.

In this case, data to be calculated are n differential data [Data A(h)−A(H)] and n+1 differential data [Data A(H)−A(h)]. As described in the description of the first modification, the standard threshold value T for binarization needs to be set negative, or the process needs to be executed in such a way that the latest n+1 differential data [Data B] acquired appears as a peak P, and the previous n differential data [Data A] appears as a bottom Bt.

Further, in the second modification, after image recognition is executed as described referring to FIG. 20 first, image recognition to which the first modification is applied may be executed, and those image recognitions may be alternately repeated.

In this case, first, image recognition is executed based on differential data [Data B-A] calculated from n differential data [Data A(H)−A(h)] and n+1 differential data [Data B(H)−B(h)] as described referring to FIG. 20. Next, the light receiving frames to be used in n-th differential data and n+1 differential data are shifted by one, and image recognition with the first modification applied thereto is executed based on differential data [Data B-A] calculated from n differential data [Data A(h)−A(H)] and n+1 differential data [Data B(h)−B(H)]. Then, those image recognitions are alternately repeated. Accordingly, the image recognition which is based on the process of the second modification, and the image recognition which has the first modification applied to the second modification are repeatedly executed.

This can ensure smoother image recognition as compared with the case where the second modification alone is applied.

The present application contains subject matter related to that disclosed in Japanese Priority Patent Application JP 2008-219198 filed in the Japan Patent Office on Aug. 28, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image recognition method comprising:
a first step of acquiring n-th received light data at light receiving elements arranged in a matrix form on a light receiving surface;
a second step of acquiring (n+1)-th received light data at the light receiving elements;
a third step of calculating differential data resulting from subtraction of the n-th received light data acquired from the (n+1)-th received light data acquired; and
a fourth step of carrying out image recognition based on the differential data, wherein a peak value and a bottom value occur in the differential data and the carrying out of the image recognition comprises one of:
setting as image information for the peak value a first binary value when the peak value is greater than a threshold value and setting as image information for the peak value a second binary value when the peak value is less than the threshold value, and
setting as image information for the bottom value a first binary value when the bottom value is less than the threshold value and setting as image information for the bottom value a second binary value when the bottom value is greater than the threshold value; and
wherein, the threshold value is adjusted by an amount that is based on a distance between a location corresponding to the peak value and a location corresponding to the bottom value.

2. The image recognition method according to claim 1, wherein the n-th received light data corresponds to an n-th frame and the (n+1)-th received light data corresponds to an (n+1)-th frame, and in the fourth step, the image information is set for the (n+1)-th frame based on the differential data only when it is determined that the distance between the location corresponding to the peak value and the location corresponding to the bottom value is greater than a predetermined value.

3. The image recognition method according to claim 2, wherein in the fourth step, when it is determined that the distance between the location corresponding to the peak value and the location corresponding to the bottom value is not greater than a predetermined value, image information set for a frame prior to the (n+1)-th frame is used as substitute image information for the (n+1)-th frame.

4. The image recognition method according to claim 3, wherein when a number of consecutive frames prior to the (n+1)-th frame for which substitute image information is used reaches a predetermined number, image information is set for the (n+1)-th frame based on the differential data regardless of whether it is determined that the distance between the location corresponding to the peak value and the location corresponding to the bottom value is greater than a predetermined value.

5. The image recognition method according to claim 4, wherein display using the light receiving surface as a display surface as well as acquisition of the received light data is carried out at the light receiving surface, and
the received light data is acquired by receiving at least one of reflected light of light used for the display and external light incident to the light receiving surface.

6. An image recognition method comprising:
a first step of acquiring n-th received light data at light receiving elements arranged in a matrix form on a light receiving surface;
a second step of acquiring (n+1)-th received light data at the light receiving elements;
a third step of calculating differential data resulting from subtraction of the n-th received light data acquired from the (n+1)-th received light data acquired; and
a fourth step of carrying out image recognition based on the differential data, wherein a peak value and a bottom value occur in the differential data and carrying out the image recognition comprises amplifying the values of the differential data by amounts based on a distance between a location corresponding to the peak value and a location corresponding to the bottom value, and one of:
outputting as image information a first binary value for the peak value when the peak value as amplified is greater than a threshold value and outputting as image information a second binary value for a peak value when the peak value as amplified is less than the threshold value, and
outputting as image information a first binary value for the bottom value when the bottom value as amplified is less than the threshold value and outputting as image information a second binary value for a bottom value when the bottom value as amplified is greater than the threshold value.

7. The image recognition method according to claim 6, wherein
the n-th received light data corresponds to an n-th frame and the (n+1)-th received light data corresponds to an (n+1)-th frame, and
in the fourth step, the image information is set for the (n+1)-th frame based on the differential data only when it is determined that the distance between the location corresponding to the peak value and the location corresponding to the bottom value is greater than a predetermined value and when it is determined that the distance between the location corresponding to the peak value and the location corresponding to the bottom value is not greater than a predetermined value, image information set for a frame prior to the (n+1)-th frame is used as substitute image information for the (n+1)-th frame, except that when a number of consecutive frames prior to the (n+1)-th frame for which substitute image information is used reaches a predetermined number, image information is set for the (n+1)-th frame based on the differential data regardless of whether it is determined that the distance between the location corresponding to the peak value and the location corresponding to the bottom value is greater than the predetermined value.

8. An image recognition method comprising:
acquiring i-th received light data at light receiving elements arranged in a matrix form on a light receiving surface;
acquiring (i+1)-th received light data at the light receiving elements;
acquiring (i+2)-th received light data at the light receiving elements;
acquiring (i+3)-th received light data at the light receiving elements;
calculating n-th differential data resulting from subtraction of the acquired i-th received light data from the acquired (i+1)-th received light data;

calculating (n+1)-th differential data resulting from subtraction of the acquired (i+2)-th received light data from the acquired (i+3)-th received light data;

calculating combined differential data resulting from subtraction of the n-th differential data from the (n+1)-th differential data;

carrying out image recognition based on the combined differential data, wherein a peak value and a bottom value occur in the combined differential data, and the carrying out of the image recognition comprises one of:

setting as image information for the peak value a first binary value when the peak value is greater than the threshold value and setting as image information for the peak value a second binary value when the peak value is less than the threshold value, and setting as image information for the bottom value a first binary value when the bottom value is less than the threshold value and setting as image information for the bottom value a second binary value when the (i+1)-th bottom value is greater than the threshold value; and wherein, the threshold value is adjusted by an amount that is based on a distance between a location corresponding to the peak value and a location corresponding to the bottom value, and wherein the light receiving surface also functions as a display surface and the i-th received light data and the (i+2)-th received light data are acquired in i-th and (i+2)-th periods, respectively, during which light is emitted from the light receiving surface and the (i+1)-th received light data and the (i+3)-th received light data are acquired in (i+1)-th and (i+3)-th periods, respectively, during which light is not emitted from the light receiving surface, the i-th, (i+1)-th, (i+2)-th, and (i+3)-th periods occurring consecutively in that order.

9. The image recognition method according to claim 8, wherein, in carrying out image recognition, the image information is set for the (i+3)-th period based on the combined differential data only when it is determined that the distance between the location corresponding to the peak value and the location corresponding to the bottom value is greater than a predetermined value and when it is determined that a distance between the location corresponding to the peak value and the location corresponding to the bottom value is not greater than a predetermined value, image information set for a period prior to the (i+3)-th period is used as substitute image information for the (i+3)-th period, except that when a number of consecutive periods prior to the (i+3)-th period for which substitute image information is used reaches a predetermined number, image information is set for the (i+3)-th period based on the differential data regardless of whether it is determined that the distance between the location corresponding to the peak value and the location corresponding to the bottom value is greater than the predetermined value.

10. An image recognition apparatus comprising:

a light receiving surface where light receiving elements are arranged in a matrix form;

a drive section that repeatedly executes acquisition of received light data at the light receiving elements; and an image processing section configured to:

calculate differential data resulting from subtraction of acquired n-th received light data from acquired (n+1)-th received light data; and carry out image recognition based on the differential data, wherein a peak value and a first bottom value occur in the differential data, wherein the image processing section carries out the image recognition by one of:

setting as image information for the peak value a first binary value when the peak value is greater than a threshold value and setting as image information for the peak value a second binary value when the peak value is less than the threshold value, and setting as image information for the bottom value a first binary value when the bottom value is less than the threshold value and setting as image information for the bottom value a second binary value when the bottom value is greater than the threshold value; and wherein, the image processing section adjusts the threshold value by an amount that is based on a distance between a location corresponding to the peak value and a location corresponding to the bottom value.

11. The image recognition apparatus of claim 10, wherein the n-th received light data corresponds to an n-th frame and the (n+1)-th received light data corresponds to an (n+1)-th frame, and in carrying out the image recognition the image processing section sets the image information for the (n+1)-th frame based on the differential data only when it is determined that the distance between the location corresponding to the peak value and the location corresponding to the bottom value is greater than a predetermined value and when it is determined that a distance between the location corresponding to the peak value and the location corresponding to the bottom value is not greater than a predetermined value, the image processing section uses image information set for a frame prior to the (n+1)-th frame as substitute image information for the (n+1)-th frame, except that when a number of consecutive frames prior to the (n+1)-th frame for which substitute image information is used reaches a predetermined number, the image processing section sets image information for the (n+1)-th frame based on the differential data regardless of whether it is determined that the distance between the location corresponding to the peak value and the location corresponding to the bottom value is greater than the predetermined value.

12. The image recognition apparatus of claim 10, wherein the light receiving surface is further configured to display images, and the received light data is acquired by the light receiving surface receiving at least one of:

display light that is emitted by the light receiving surface while displaying an image and reflected back to the light receiving surface, and external light incident to the light receiving surface.

* * * * *